United States Patent
Lee et al.

(10) Patent No.: US 10,776,597 B1
(45) Date of Patent: Sep. 15, 2020

(54) ANALYSIS AND DECODE MODULE FOR A BARCODE READING SYSTEM

(71) Applicant: The Code Corporation, Draper, UT (US)

(72) Inventors: Jason Lee, Concord, MA (US); Ming Lei, Princeton Junction, NJ (US)

(73) Assignee: The Code Corporation, Murray, UT (US)

( * ) Notice: Subject to any disclaimer, the term of this patent is extended or adjusted under 35 U.S.C. 154(b) by 0 days.

(21) Appl. No.: 16/512,209

(22) Filed: Jul. 15, 2019

(51) Int. Cl.
*G06K 7/10* (2006.01)
*G06K 7/14* (2006.01)

(52) U.S. Cl.
CPC ......... *G06K 7/1417* (2013.01); *G06K 7/1486* (2013.01); *G06K 7/1495* (2013.01)

(58) Field of Classification Search
USPC ...................................... 235/462.01–462.49
See application file for complete search history.

(56) References Cited

U.S. PATENT DOCUMENTS

| 8,256,678 B2 * | 9/2012 | Havens | G06K 7/10722 235/462.14 |
| 2004/0118928 A1 * | 6/2004 | Patel | G06K 7/10386 235/472.01 |

* cited by examiner

*Primary Examiner* — Jamara A Franklin
(74) *Attorney, Agent, or Firm* — Timothy P. O'Hagan; Ray Quinney & Nebeker

(57) ABSTRACT

An analysis and decode module is described. A barcode reading system may include an image sensor system package and a separate image decoding system. The image sensor system package may provide input to the image decoding system through an interface. The input may include a captured image, image capture settings, and an operation list. The image decoding system, using the analysis and decode module, may perform one or more operations identified in the operation list on the capture image. The image decoding system may then output information to the image sensor system package using the interface. The output may indicate whether the image decoding system was able to decode a barcode and how the image sensor system package may modify the image capture settings to produce an image more suitable for decoding. The image sensor system package may then determine new image capture settings for capturing a new image.

20 Claims, 24 Drawing Sheets

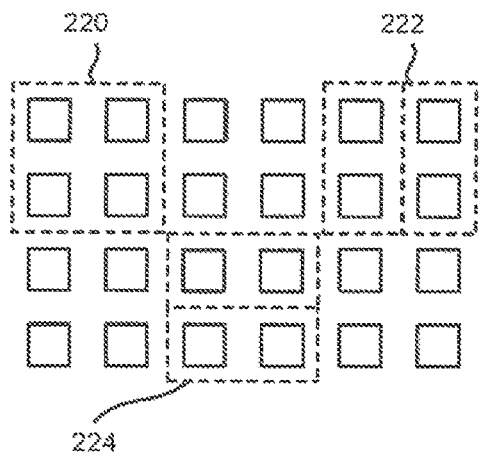
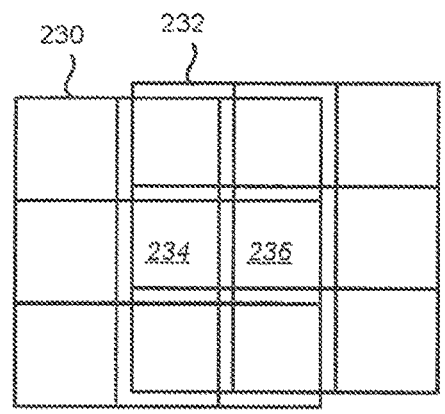
FIG. 5A
FIG. 5B
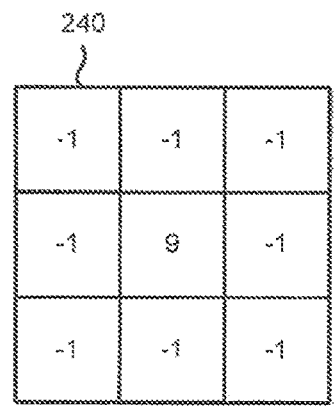
FIG. 5C
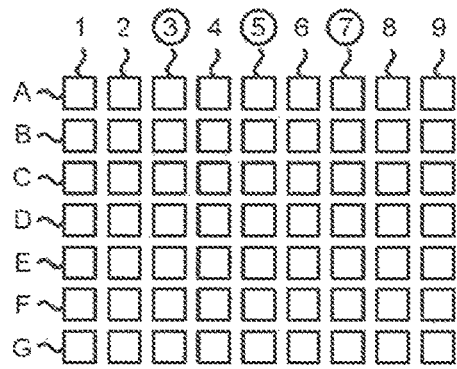
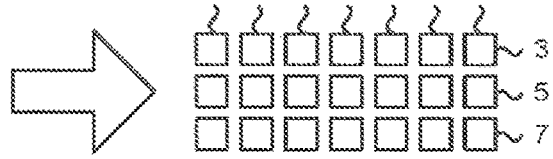
FIG. 5D

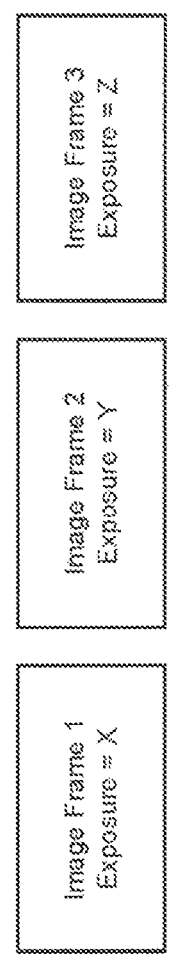

| Exemplary Derivatives of a Frame of Image Data Produced by Permutations of Preprocessing Circuits or an Image Processing Module |
|---|
| Full Frame |
| Binning of a Full Frame or a Window of a Full Frame (Average Digital Values) |
| Sub-Sample of a Full Frame for a Window of a Full Frame |
| Rotation of Full Frame, a Window of a Full Frame or Binned Full Frame or Window of a Full Frame. (All Columns or Sub-Sampled Selected Columns/Rows) |
| Convolution of Full Frame, a Window of a Full Frame, a Binned Full Frame or Window of a Full Frame, or a Sub-Sampled Full Frame of Window of a Full Frame (Selected One of Multiple Kernels) |
| Double Convolution of Full Frame, a Window of a Full Frame, a Binned Full Frame or Window of a Full Frame, or a Sub-Sampled Full Frame of Window of a Full Frame (Two Distinct Kernels Applied Sequentially) |

FIG. 7

ANALYSIS AND DECODE MODULE FOR A BARCODE READING SYSTEM

CROSS-REFERENCE TO RELATED APPLICATIONS

N/A

BACKGROUND

A barcode is an optical machine-readable representation of information. Devices for identifying or extracting information from barcodes are generally referred to as barcode readers (or barcode scanners). An image-based barcode reader includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode.

SUMMARY

In accordance with one aspect of the present disclosure, a barcode reading system is disclosed that may include an image capture system that includes an image sensor system package. The image sensor system package may include a control module. The image capture system may be configured to capture a first image using a first set of capture settings and a second image using a second set of capture settings. The control module may be configured to determine the second set of capture settings for use by the image capture system in capturing the second image. The barcode reading system may also include an interface and an image decoding system configured to receive the first image and the first set of capture settings from the image sensor system package through the interface and to output a first result status and a first set of data to the image sensor system package through the interface. The control module may be configured to receive the first result status, the first set of data, and the first set of capture settings and determine the second set of capture settings based at least in part on one or more of the first result status, the first set of data, and the first set of capture settings.

The image decoding system may be further configured to receive a first operation list. The image decoding system may include analysis and decode blocks configured to perform analysis and decode features. The first operation list may identify one or more of the analysis and decode features.

The analysis and decode blocks may include one or more of an Automatic Gain Control feature, a quality feature, a cellphone detection feature, a motion detection feature, and a decode feature.

The image decoding system may be further configured to, after receiving the first image, select a first analysis and decode feature identified in the first operation list and process the first image using the first analysis and decode feature to determine a first block output.

The image decoding system may be further configured to determine whether the first operation list identifies another analysis and decode feature and, if the first operation list does not identify another analysis and decode feature, determine the first result status and the first set of data based on the first block output.

The image decoding system may be further configured to receive a first set of decode parameters and, if the first operation list identifies another analysis and decode feature, determine a new set of decode parameters based at least in part on the first block output, select a second analysis and decode feature from the first operation list, and process the first image using the second analysis and decode feature to determine a second block output.

The image decoding system may be further configured to receive a first set of decode parameters and a first operation list and the control module may be further configured to determine a second set of decode parameters and a second operation list based at least in part on one or more of the first result status, the first set of data, and the first set of capture settings.

The first result status may indicate one or more of decoded with data, nothing found, located barcode, cellphone detected, or motion detected and the first set of data includes one or more of AGC data and quality data.

The image decoding system may be further configured to receive the second image and the second set of capture settings and output to the image sensor system package, through the interface, a second result status and a second set of data.

The barcode reading system may be further configured to, if the second result status indicates decoded with data, output decoded data for the second image.

The control module may be further configured to, if the second result status does not indicate decoded with data, determine a third set of capture settings for use in capturing a third image based at least in part on one or more of the second result status, the second set of data, and the second set of capture settings.

In accordance with another aspect of the present disclosure, a computer-readable medium is disclosed that may include instructions that are executable by one or more processors to cause a computing system to receive, by an image decoding system, a first image and a first set of input settings. The instructions may also be executable by the one or more processors to cause the computing system to determine, by the image decoding system, a first result status and a first set of data using the first image and the first set of input settings. The instructions may also be executable by the one or more processors to cause the computing system to determine that the first result status does not indicate decoded with data. The instructions may also be executable by the one or more processors to cause the computing system to determine, by an image sensor system package, a second set of input settings based at least in part on the first result status, the first set of data, and the first set of input settings.

The first set of input settings may include a first set of image capture settings used for capturing the first image, a first set of decode parameters, and a first operation list.

The first operation list may identify one or more analysis and decode features and determine the first result status and the first set of data includes analyzing the first image using a first analysis and decode feature identified in the first operation list.

The computer-readable medium may further include additional instructions that are executable by the one or more processors to cause the computing system to receive, by the image decoding system, a second image and the second set of input settings. The computer-readable medium may further include additional instructions that are executable by the one or more processors to cause the computing system to determine, by the image decoding system, a second result status and a second set of data using the second image and the second set of input settings.

The computer-readable medium may further include additional instructions that are executable by the one or more processors to cause the computing system to determine, by the image sensor system package, that the second result status indicates decoded with data. The computer-readable medium may further include additional instructions that are executable by the one or more processors to cause the computing system to output decoded data for the second image.

The computer-readable medium may further include additional instructions that are executable by the one or more processors to cause the computing system to determine that the second result status does not indicate decoded with data. The computer-readable medium may further include additional instructions that are executable by the one or more processors to cause the computing system to determine, by the image sensor system package, a third set of input settings based at least in part on the second result status, the second set of data, and the second set of input settings.

In accordance with another aspect of the present disclosure, a computer-readable medium is disclosed that includes instructions that are executable by one or more processors to cause a computing system to receive an image of a barcode, capture settings for the image of the barcode, decode parameters, and an operation list. The operation list may identify two or more analysis and decode features. The computer-readable medium may further include instructions that are executable by the one or more processors to cause the computing system to, for each analysis and decode feature identified in the operation list that is not skipped, process the image using the analysis and decode feature to determine a feature result status and a set of feature data, and determine whether to modify the decode parameters based on the feature result status and the set of feature data. Modifying the decode parameters may include changing the decode parameters and skipping a decode feature. The computer-readable medium may further include instructions that are executable by the one or more processors to cause the computing system to output a result status and a set of data for use in determining a new set of capture settings.

The computer-readable medium may further include additional instructions that are executable by the one or more processors to cause the computing system to determine whether to add additional analysis and decode features to the operation list based on the capture settings and the operation list and, for each analysis and decode feature identified in the operation list, after processing the image using the analysis and decode feature, remove the analysis and decode feature from the operation list.

The computer-readable medium may further include additional instructions that are executable by the one or more processors to cause the computing system to, for each analysis and decode feature identified in the operation list, determine whether to skip the analysis and decode feature based on the capture settings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which:

FIGS. 5A-5D show examples of pre-processing in accordance with some embodiments of the present disclosure.

FIGS. 6A and 6B show examples of a frame of image data generated with different settings in accordance with embodiments of the present disclosure.

FIG. 7 shows exemplary derivatives of a frame of image data produced by permutations of pre-processing circuits in accordance with the present disclosure.

DETAILED DESCRIPTION

Figure 1:
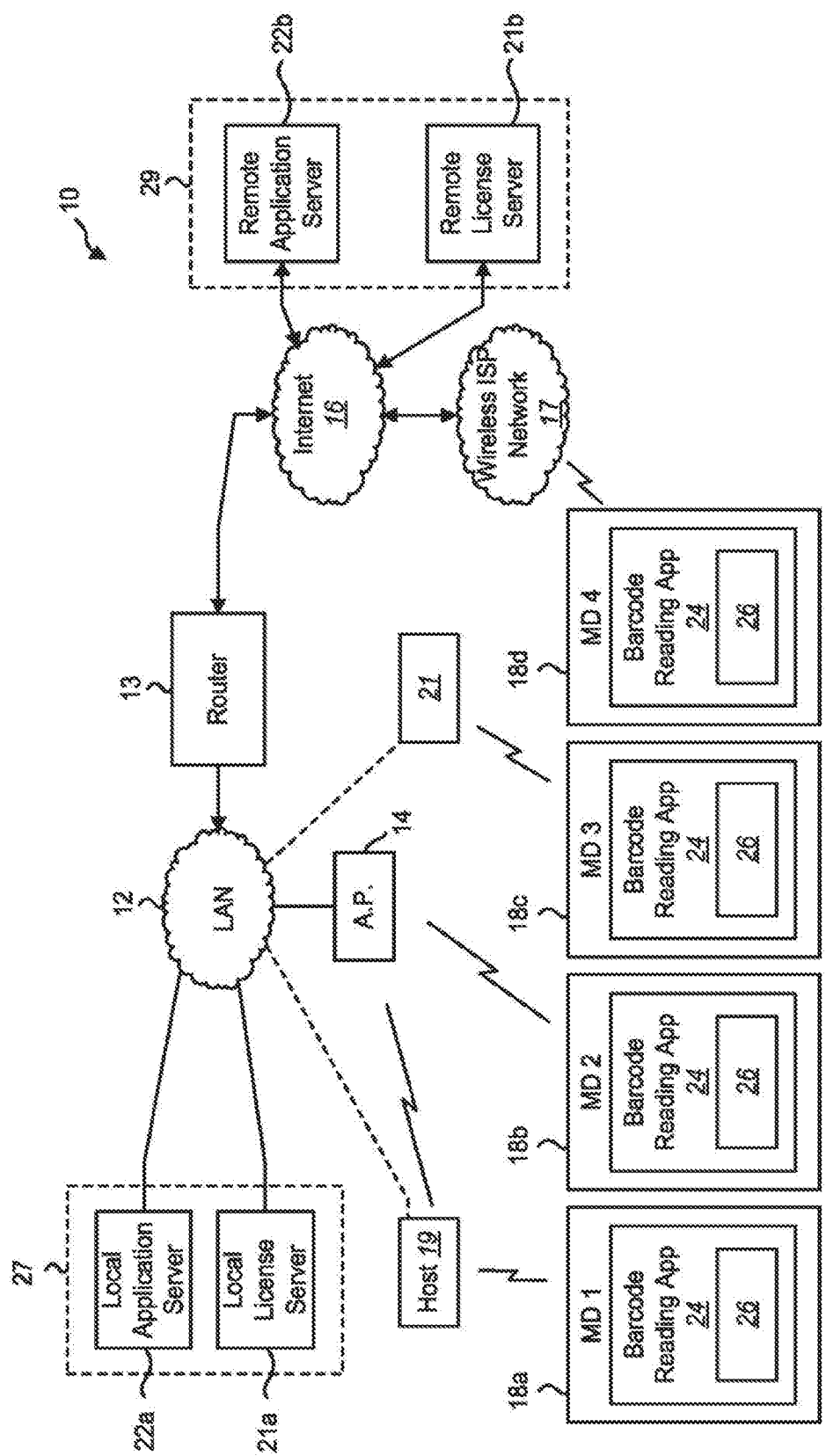
FIG. 1 illustrates a system in which aspects of the present disclosure may be utilized.

FIG. 1 depicts a system 10 according to one embodiment of the present application wherein mobile devices 18a-18d obtain: i) at least one barcode-reading application 24 from an application server 22a or 22b; and ii) obtain licensing (e.g., a license key 26) necessary for the operation of the at least one barcode-reading application 24 on the mobile devices 18a-18d from a licensing server 21a or 21b.

As used in this patent specification and the accompanying claims, the term "mobile device" will be used to describe a portable, hand-held computing device that comprises a camera. As indicated above, one example of a mobile device is a smartphone. Another example of a mobile device is a tablet computer. Yet another example is a hybrid tablet/smartphone device, often nicknamed a "phablet."

The application server may be, for example, a local application server 22a or a remote application server 22b. Similarly, the license server may be a local license server 21a or a remote license server 21b. The application server and the license server may operate on distinct hardware or may operate on the same hardware server. For example, the local application server 22a and the local license server 21a may operate on the same hardware server 27 or on distinct hardware servers, each coupled to a local area network (LAN) 12. Similarly, the remote application server 22b and the remote license server 21b may operate on the same hardware server 29 or on distinct hardware servers, each coupled to the Internet 16.

The system 10 may include a LAN 12 to which each of the local application server 22a and the local license server 21a are connected. The LAN 12 may further include at least one wireless access point 14 enabling LAN communications with mobile devices (for example, mobile devices 18b and 18c) as well as other computing systems such as a host computer 19 and/or a charging station 21 (e.g., a station for providing power to the mobile device 18 for charging its battery).

The LAN 12 may be coupled to the Internet 16 via a router 13. Although FIG. 1 depicts the LAN 12 coupled to the Internet 16 via a single router 13, such connections may employ multiple routers and firewall systems, including demilitarized zone (DMZ) networks.

Figure 1A:
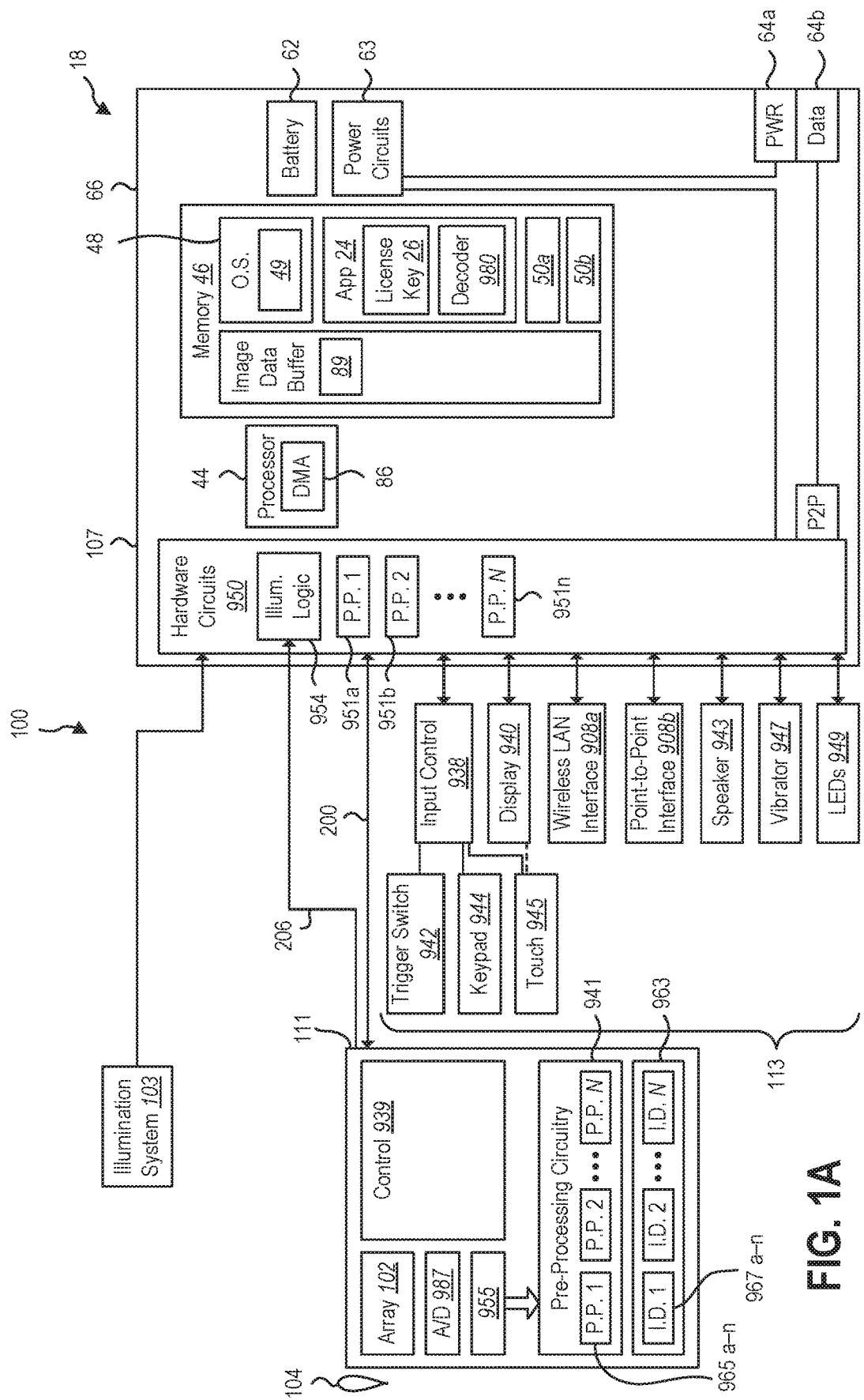
FIG. 1A illustrates an example of a barcode reading system in accordance with the present disclosure.

Referring to FIG. 1A in conjunction with FIG. 1, each of the mobile devices 18a-18d may include a barcode reading system 100 as shown in FIG. 1A. In accordance with one embodiment, the barcode reading system 100 may include an image decoding system 107 in combination with an image sensor system package 111, an illumination system 103, and various input/output (I/O) peripheral systems 113.

The image sensor system package 111 and the image decoding system 107 may be included in two separate packages, each of which may include one or more silicon dies that may include: i) a processor; ii) hardware circuits including digital signal processing and/or gate logic, and iii) memory.

The image sensor system package 111 may be coupled to the image decoding system 107 via a communication interface 200. For simplicity, the communication interface 200 may sometimes be referred to herein simply as an interface 200.

I/O Peripheral Systems

The I/O peripheral systems 113 may include a user interface comprising input control 938 and/or a display 940. The input control 938 may include a trigger switch 942, a keypad 944, and/or a touch panel 945, such as a touch screen over the display 940. In addition, the barcode reading system 100 may have one or more output devices that convey information to a user. Such output devices may include the touch panel 945, which may be a touch screen, a speaker 943, a vibrator 947, and/or one or more components that illuminate in a manner visible to a user, such as one or more LEDs 949.

The I/O peripheral systems 113 may further include one or more communication interfaces. The communication interfaces may include a wireless LAN interface 908a and a point-to-point interface 908b which may be a wireless point-to-point interface and/or a hardwired point-to-point interface.

The wireless LAN interface 908a may permit the barcode reading system 100 to be an addressable endpoint in a wireless local area network and communicate with a host device through the LAN using, for example, Transmission Control Protocol/Internet Protocol (TCP/IP) or the like.

The wireless point-to-point interface(s) 908b may be, for example, a Bluetooth® interface to enable the barcode reading system 100 to establish a wireless point-to-point communication link with, and communicate over the wireless communication link with, a host device (i.e., a host computer).

The hardwired point-to-point interface(s) 908b may comprise a Universal Asynchronous Receiver/Transmitter (UART) or a Universal Serial Bus (USB) in each case to enable the barcode reading system 100 to establish a point-to-point connection with a host device using a multi-conductor data interface.

Image Decoding System

The image decoding system 107 may include: i) a processor 44; ii) a memory 46; and iii) hardware circuits 950 for coupling to, and driving operation of, each of the illumination system 103, the I/O peripheral systems 113, and the image sensor system package 111.

The processor 44 may be embodied as a combination of one or more microprocessors, microcontrollers, digital signal processors (DSP), or the like, and, when operating, may execute instructions (in the form of an operating system and/or applications) stored in the memory 46. The memory 46 may be any component capable of storing electronic information, including an operating system and/or application instructions executable by the processor 44, and may be embodied as read-only memory (ROM), random access memory (RAM), magnetic disk storage media, optical storage media, flash memory devices, on-board memory included with the processor 44, erasable programmable read-only memory (EPROM), electrically erasable programmable read-only memory (EEPROM), and/or registers, etc.

The memory 46 may include an operating system 48, the barcode-reading application 24, one or more other applications 50*a*, 50*b*, and a data buffer including an image data buffer 89. The barcode-reading application 24 may include a license key 26 and a decoder 980. The decoder 980 may be configured to process image frames and attempt to decode barcodes contained therein. The license key 26 may be required in order to use the decoder 980 (or, alternatively, in order to use all of the functionality of the decoder 980). In operation, the processor 44 may execute instructions embodied in the operating system 48, the barcode-reading application 24, and each of the other applications 50*a*, 50*b*.

The hardware circuits 950 provide the interface between the image decoding system 107 and each of the illumination system 103, the I/O peripheral systems 113, and the image sensor system package 111. The hardware circuits 950 may further include illumination logic 954 and pre-processing circuits 951*a-n*.

Image Sensor System Package

The image sensor system package 111 may include: i) a two-dimensional photo sensor array 102 onto which illumination from the field of view of the barcode reading system 100 (FIG. 1A) is focused by the optic system 104; ii) pre-processing circuitry 941 comprising one or more pre-processing circuits 965*a-n*; iii) volatile memory or storage such as random access memory implementing an image buffer 963; iv) hardware gate logic implementing wide bus logic 955 for transferring each image frame captured by the photo sensor array 102 to the pre-processing circuitry 941 (or the image buffer 963); and v) control circuitry 939 which may include a combination of gate logic, volatile memory or storage, a processor executing code stored in the memory implementing control of the photo sensor array 102 (image read-out), the wide bus logic 955, the pre-processing circuitry 941; the image buffer 963, and transfer of image data records to the image decoding system 107.

Photo Sensor Array

The photo sensor array 102 may comprise a two-dimensional rolling shutter array of pixels with each pixel comprising an active photosensitive region capable of measuring or quantifying the intensity of illumination incident on the pixel fabricated, for example, using known complementary metal oxide semiconductor (CMOS) sensor technology. Each pixel may be a photodiode which accumulates charge over the duration of an exposure period. Prior to commencement of the exposure period the photodiode may be coupled to ground to dissipate an accumulated charge and the exposure period for the pixel may commence when the photodiode is de-coupled from ground so that a charge accumulates in proportion to the intensity of illumination incident on the pixel. The charge on the photodiode continues to accumulate so long as illumination is incident on the photodiode. The exposure period ends when the accumulated charge is measured by an analog to digital (A/D) converter.

In one embodiment, the photodiode may couple to the input of an A/D converter when the control circuitry 939 generates a read signal and, upon coupled of the photodiode to the A/D converter, the A/D converter generates a digital value representative of the accumulated charge at the time the photodiode is coupled to the A/D converter which is input to a register of the wide bus logic 955 for transfer to the pre-processing circuits 965*a-n* (or the image buffer 963).

In another embodiment, the photodiode may be coupled to the input of an A/D converter prior to the end of the exposure period. In this embodiment, the A/D converter may be continually making a digital value representative of the accumulating charge available at its output port with that digital value continually increasing as charge accumulates on the photodiode (i.e. periodically updating the digital value to represent the increasing voltage as charge accumulates on the photodiode). In this embodiment when the control circuitry 939 generates a read signal the then current digital value (at the time of the read signal) is read or input to a register of the wide bus logic 955 for transfer to the pre-processing circuits 965*a-n* (or the image buffer 963).

In order to improve sensitivity of the photo sensor array 102, the pixels do not include a masked charge storage region associated with each photosensitive region for temporarily holding accumulated charge from the photodiode region prior to coupling the charge from the photodiode to the A/D converter 987. Directly coupling the photosensitive region to the A/D converter 987 means that there is no charge storage region separate from the photodiode on which charge is accumulating. Stated another way, in neither of the foregoing embodiments, is the accumulated charge on the photodiode buffered, as an analog charge or otherwise, prior to being coupled to the A/D converter. Stated in yet another way, in neither of the foregoing embodiments is accumulation of the charge stopped, or the accumulated charge otherwise made static (no more accumulation) prior to being coupled to the A/D converter.

Figure 2A:
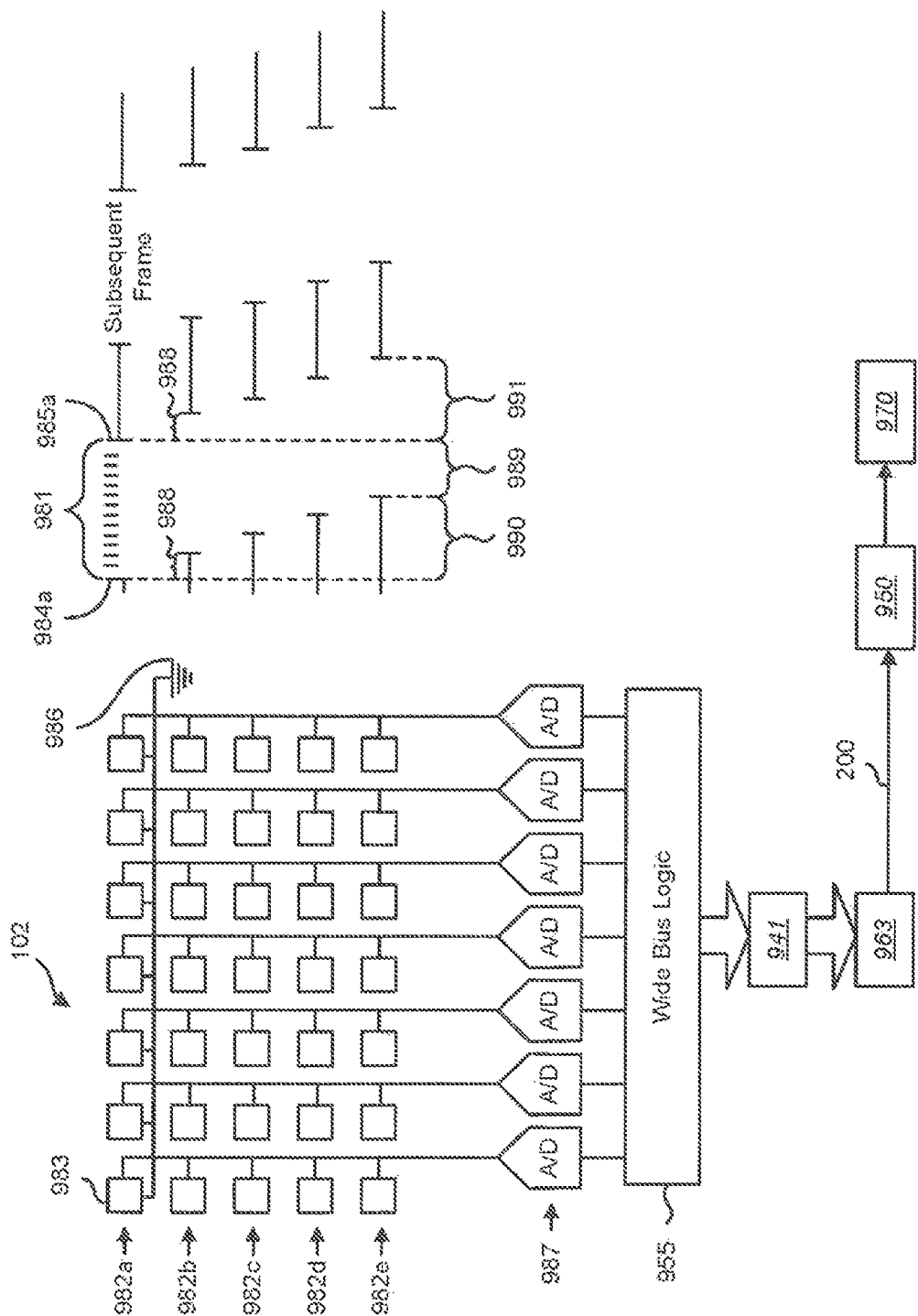
FIG. 2A shows image read-out circuitry and an operation of an image reading out in accordance with one embodiment of the present disclosure.

FIG. 2A depicts a photo sensor array 102 with A/D converters 987 and an image capture operation in accordance with one embodiment of the present disclosure. The photo sensor array 102 may comprise a plurality of rows of pixels 982*a-e* and one A/D converter 987 per column of pixels such that each pixel in an entire row may have a simultaneous exposure period end time and may be simultaneously coupled to a corresponding analog-to-digital (A/D) converter 987 which generates the digital value at the end of the exposure period applicable to the pixel.

In the exemplary embodiment wherein there is one A/D converter per column, the photo sensor array 102 may be operative such that exposure of the rows of pixels 982*a-e* is initiated, and subsequently terminated, sequentially from the first of the plurality of rows (e.g., row 982*a*) to the last of the plurality of rows (e.g., row 982*e*), one row at a time from either the top of the photo sensor array 102 to the bottom of the photo sensor array 102 or from a top row within a cropped window of the photo sensor array 102 to the bottom row within the cropped window of the photo sensor array 102.

More specifically, using row 982*a* at a top of the photo sensor array 102 as an example, the exposure period begins at a start of an exposure period 984*a* and the end of the exposure period 985*a*. The start of the exposure period 984*a* begins when the photosensitive region 983 of each pixel within the row is contacted with the ground 986 to dissipate any charge which may have accumulated on the photosensitive region 983 prior to the beginning of the exposure period. The end of the exposure period 985*a* is when the photosensitive region 983 of each pixel in the row is coupled directly to an A/D converter 987 and the A/D converter 987 generates a digital intensity value (digital value) representative of the accumulated charge. The digital intensity value for each pixel within the row may be written to a register of the wide bus logic 955 for output to the pre-processing circuits 965*a-n* or directly to the image buffer 963.

It should be appreciated that one row of pixels at a time may be simultaneously exposed (simultaneous commencement and subsequent simultaneous termination of an exposure period). The next row of pixels may then have a simultaneous exposure period that does not require termination (e.g. coupling of each pixel to an A/D converter) until after the A/D converters have completed operation on the previous row. The time required for an A/D converter to produce a digital value representative of accumulated charge may be referred to as the A/D converter cycle time. When the quantity of A/D converters is equal to the number of columns the minimum read-out time for all rows would be the number of rows multiplied by the A/D converter cycle time.

In more detail, the start of exposure for each row is initiated at a predetermined amount of time 988 following the start of exposure for the immediately preceding row and the end of exposure for each row occurs at the predetermined amount of time 988 following the end of exposure for the immediately preceding row. The predetermined amount of time 988 may be greater than the time required for each pixel in the row to be coupled to its A/D converter 987, the intensity value to be written to the register of the wide bus logic 955, and the register value to be output to the pre-processing circuits 965*a-n* or written to the image buffer 963. In the exemplary embodiment, each row of pixels an exposure period long enough, and read-out fast enough, such that the exposure period is initiated for the last row of pixels 982*e* of the photo sensor array 102 prior to the end of the exposure period (i.e., when read-out commences) for the first row of pixels 982*a* of the photo sensor array 102 such that a time period 989 exists when all rows are being simultaneously exposed.

As such, the total exposure period for the array of pixels comprises: i) a first period 990 being the time between when exposure of the first row of the array is initiated and exposure of the last row of the array is initiated; ii) a second period 989 being the time when all rows are being simultaneously exposed; and iii) a third period 991 being the time between when read-out of the first row of the array is initiated and read-out of the last row is initiated (i.e., the time between when exposure of the first row ends and exposure of the last row of the array ends). In one embodiment, the total exposure period for any particular row remains less than 20 ms. In another embodiment, the total period from start of exposure for the first row and end of exposure for the last row may be less than 20 ms.

In one embodiment, the exposure period 981 may be expressed as a quantity of rows of the image sensor array. The total exposure time may be expressed as the number of rows multiplied by the time 988 required to read-out a row. Stated another way, when the exposure period 981 is expressed as a quantity of rows, the numerical value for the exposure period is the quantity of rows between the row that is then currently commencing its exposure period and the row that is then currently being read-out (ending exposure period). When the exposure period is very short (i.e., a quantity of rows less than the total quantity of rows in the array) read-out of the rows that first started exposure (for example at the top of the array if exposure runs from the top to the bottom) commences before rows at the bottom of the array begin exposure. However, as described above, in the exemplary embodiment, read-out is very fast such that the exposure period, when expressed as a quantity of rows, will be a numerical value greater than the total number of rows in the photo sensor array 102.

While FIG. 2A depicts one A/D converter 987 per column, it should be appreciated that other configurations may include fewer A/D converters 987 (fewer than one (A/D converter 987 per column) or more than one A/D converter 987 per column. The quantity of A/D converters may define the quantity of pixels for which the exposure period may simultaneously end (e.g. the quantity of pixels for which the accumulated charge may be simultaneously converted to a corresponding digital value).

As another example, if the quantity of A/D converters is equal to half the number of columns, one-half of a row of pixels may be simultaneously exposed. The next one-half row of pixels may then have a simultaneous exposure period that does not require termination until after the A/D converters have completed operation on the previous one-half row. If the quantity of A/D converters is equal to one-half the number of columns it would require two A/D converter read-out cycles to read-out each row and the minimum read-out time for all rows would be the number of rows multiplied by two and then multiplied by the A/D converter cycle time.

Figure 2B:
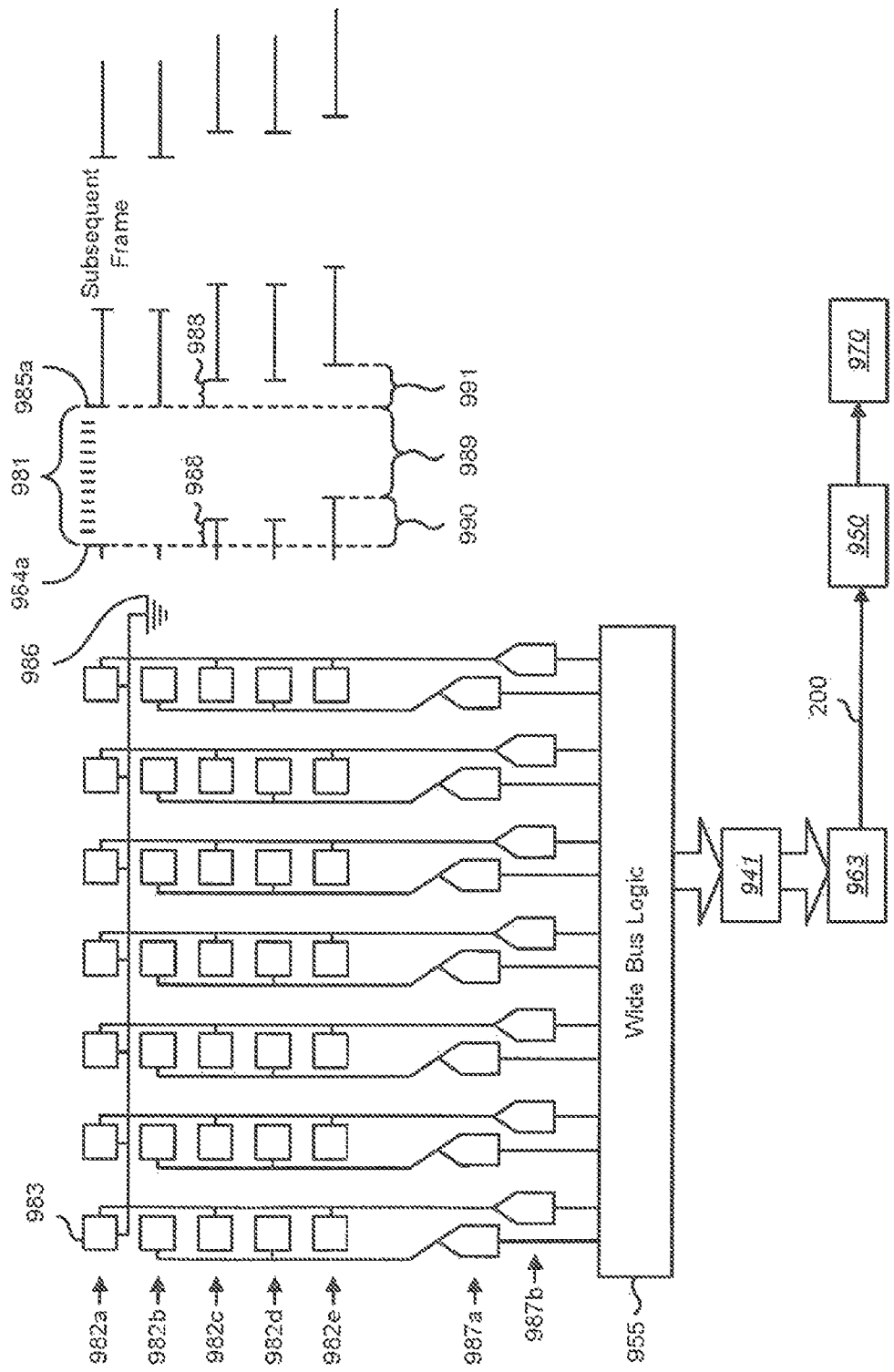
FIG. 2B shows image read-out circuitry and an operation of an image reading out in accordance with another embodiment of the present disclosure.

Similarly, as depicted in FIG. 2B, the quantity of A/D converters 987*a* and 987*b* may be equal to twice the number of columns (arranged in two banks of A/D converters 987*a* and 987*b*). In this exemplary embodiment, there are a sufficient quantity of A/D converters to read-out two rows simultaneously. Each bank of A/D converters 987*a* and 987*b* is connected to, and operates on, every other alternating row of pixels. As such, the photo sensor array 102 may be operative such that exposure of the rows of pixels 982*a-e* is initiated, and subsequently terminated, sequentially in two-row groups from the first group of rows (e.g., row 982*a-b*) to the last of the plurality of rows (e.g., group including rows 982*d-e*).

More specifically, using rows 982*a* and 982*b* at as top of the photo sensor array 102 as an example, the exposure period begins at a start of an exposure period 984*a* and the end of the exposure period 985*a*. The start of the exposure period 984*a* begins when the photosensitive region 983 of each pixel within the two rows is contacted with the ground 986 to dissipate any charge which may have accumulated on the photosensitive region 983 prior to the beginning of the exposure period. The end of the exposure period 985*a* is when the photosensitive region 983 of each pixel in the two rows is coupled directly to an A/D converter 987*a*, 987*b* and the A/D converter 987 to generate a digital intensity value (digital value) representative of the accumulated charge. The digital intensity value for each pixel within the two rows may be written to a register of the wide bus logic 955 for output to the pre-processing circuits 965*a-n* or directly to the image buffer 963.

It should be appreciated that in this embodiment two rows of pixels at a time may be simultaneously exposed (simultaneous commencement and subsequent simultaneous termination of an exposure period). The next group of two rows of pixels may then have a simultaneous exposure period that does not require termination (e.g. coupling of each pixel to an A/D converter) until after the A/D converters have completed operation on the previous group of two rows. Again, the time required for an A/D converter to produce a digital value representative of accumulated charge may be referred to as the A/D converter cycle time. When the quantity of A/D converters is equal to twice the number of columns the minimum read-out time for all rows would be one half the number of rows multiplied by the A/D converter cycle time.

In more detail, the start of exposure for each group of two rows is initiated at a predetermined amount of time 988 following the start of exposure for the immediately preceding group of two rows and the end of exposure for each group of two rows occurs at the predetermined amount of time 988 following the end of exposure for the immediately preceding group of two rows.

The predetermined amount of time 988 may be greater than the time required for each pixel in the group of two rows to be coupled to its A/D converter 987, the intensity value to be written to the register of the wide bus logic 955, and the register value to be output to the pre-processing circuits 965*a-n* or written to the image buffer 963. In the exemplary embodiment, each pixel within the group of two rows is subject to an exposure period long enough, and read-out fast enough, such that the exposure period is initiated for the last group of two rows of pixels 982*d-e* of the photo sensor array 102 prior to the end of the exposure period (i.e., when read-out commences) for the first group of two rows of pixels 982*a-b* of the photo sensor array 102 such that a time period 989 exists when all rows are being simultaneously exposed.

As such, the total exposure period for the array of pixels comprises: i) a first period 990 being the time between when exposure of the first group of two rows of the array is initiated and exposure of the last group of two rows of the array is initiated; ii) a second period 989 being the time when all rows are being simultaneously exposed; and iii) a third period 991 being the time between when read-out of the first group of two rows of the array is initiated and read-out of the last group of two rows is initiated (i.e., the time between when exposure of the first group of two rows ends and exposure of the last group of two rows of the array ends).

In one embodiment, the total exposure period for any particular group of two rows remains less than 20 ms. Alternatively, the total period from start of exposure for the first group of two rows and end of exposure for the last group of two rows may be less than 20 ms.

Windowing, Binning, Sub Sampling (Read-Out Level)

The term image frame, as used herein, may be a full image frame, a binned image frame, a sub-sampled image frame, or a window of any of a full, binned, or sub-sampled image frame.

As used herein, the term "full image frame" refers to an image frame that is captured when an entire photo sensor array 102 is exposed and read-out. Thus, a full image frame may include pixels corresponding to all of the photo sensors in the photo sensor array 102.

As used herein, the term "binned image frame" refers to an image frame that is captured by simultaneously combining the photodiodes for multiple adjacent pixels to a single A/C converter (effectively creating a single pixel with a larger photosensitive region comprising the photosensitive regions of the combined pixels, but an overall lower resolution for the image frame). Common binning may include combining groups of two adjacent pixels horizontally, groups of two adjacent pixels vertically, and two-by-two groups of pixels as depicted in FIG. 5A. The resolution values of the image capture parameter values for an image frame that is to be captured as a binned image frame will define the binning (how adjacent pixels are to be grouped).

As used herein the term "sub-sampled image frame" refers to an image frame that is captured at a lower resolution utilizing a pattern of fewer than all of the pixels applied across the full photo sensor, for example every second pixel or every fourth pixel. The used pixels are read-out while the un-used pixels are not-read-out or the data is ignored. The resolution values of the image capture parameter values for an image frame that is to be captured as a sub-sampled image frame will define the sub-sampling ratio of pixels which are read and used versus un-used pixels.

As used herein the term "a window of an image frame" refers to a portion of a full image frame, a binned image frame or a sub-sampled image frame that is smaller than the full photo sensor array image, either by vertical cropping, horizontal cropping, or both. The portions of the pixels outside of the cropping may not be read-out. The image capture parameter values for an image frame that is to be captured as a windowed image frame (full, binned, or sub-sampled) will define the horizontal and vertical cropping, as applicable.

It should be appreciated that binning, subsampling, and windowing may be performed by the photo sensor array 102 at read-out such that the resulting image frame (full, binned, sub-sampled, and/or windowed) is the image frame input to the pre-processing circuits 965*a-n*.

Wide Bus Logic

To enable digital values representative of illumination on pixels to be transferred very quickly from the A/D converters 987 to the pre-processing circuits 965*a-n* (or written directly to the image buffer 963) wide bus logic 955 may transfer the digital intensity values from all A/D converters 987 to the pre-processing circuits 965*a-n* (or the image buffer 963) in parallel (e.g. the same clocking cycles transfer all digital intensity values from all A/D converters 987 to the pre-processing circuits 965*a-n* (or the image buffer 963) simultaneously).

Stated another way, the wide bus logic 955 may include transfer logic modules, each implementing a channel for transfer of a digital intensity value from an A/D converter 987 to the pre-processing circuits 965*a-n* (or the image buffer 963), with the quantity of transfer logic modules being equal to the quantity of A/D converters, and with each distinct transfer logic module being coupled to the output of one distinct A/D converter. Stated yet another way, the wide bus logic 955 may implement a digital intensity value transfer bus (from the A/D converters 987 to the pre-processing circuits 965*a-n* (or the image buffer 963) that is as wide as the number of A/D converters.

Alternatively, the width of the wide bus logic 955 may be 50% of the number of A/D converters, in which case it would take two bus cycles to transfer all digital intensity values from all A/D converters to the pre-processing circuits 965*a-n* or to the image buffer 963. Alternatively, the width of the wide bus logic 955 may be 25% of the number of columns, in which case it would take four bus cycles to transfer all digital intensity values from all A/D converters to the pre-processing circuits 965*a-n* or to the image buffer 963. It should be noted that the width of the wide bus logic 955 may be any percentage of the number of columns of the photo sensor array. However, if an entire row of pixels is to undergo a simultaneous exposure period utilizing a quantity of A/D converters equal to the number of pixels in the row, but the bus logic 955 is not sufficient to transfer digital intensity values from all A/D converters simultaneously, the bus logic 955 may include first-in-first-out (FIFO) buffers (one FIFO buffer for each A/D converter) for buffering digital intensity values prior to transfer to the pre-processing circuits 965*a-n* or to the image buffer 963.

Pre-Processing Circuits

Returning to FIG. 1A, the pre-processing circuitry 941 includes multiple pre-processing circuits 965*a-n*. The pre-processing circuits 965*a-n* may perform operations such as convolution, binning, sub-sampling, cropping and other image processing functions on an image frame (full, binned, sub-sampled, and/or cropped) to generate one or more image data record 967*a-n*, each of which is derived from the image frame or an image data record that was previously derived from the image frame.

Each pre-processing circuit 965*a-n* may receive as input either: i) a an image frame (full, binned, sub-sampled, and/or cropped) received directly from the photo sensor array 102 by way of the wide bus logic 955; or ii) an image data record 967*a-n* from the image buffer 963 which is the result of a different pre-processing circuit 965*a-n* previously operating on an image frame (full, binned, sub-sampled, and/or cropped) received directly from the photo sensor array 102 by way of the wide bus logic 955.

It should be noted that one image frame (full, binned, sub-sampled, and/or cropped) may be input to multiple pre-processing circuits 965*a-n* resulting in multiple image data records 967*a-n* being written to the image buffer 963 for the same frame of image data. Further, for a burst of multiple image frames (described herein), each image frame (full, binned, sub-sampled, and/or cropped) may be input to the same one or more pre-processing circuits 965*a-n* or permutations of different image frames of the burst may be input to different subsets of pre-processing circuits 965*a-n*, each subset including one or more pre-processing circuits 965*a-n*.

It should also be noted that one of the pre-processing circuits 965 may simply write the image frame (full, binned, sub-sampled, and/or cropped) to the image buffer 963 as an image data record 967*a-n* without performing substantive image processing (e.g. writing the intensity values received from the A/D converters for the image frame to the image buffer).

Referring briefly to FIG. 7, image processing functions that may be performed by any of the image pre-processing circuits 965*a-n* and the image data records 967*a-n* derived from each image frame (whether full, binned, sub-sampled, and/or windowed and/or cropped) include: i) transfer of the image frame or a window within an image frame (full, binned, cropped, or sub-sampled) as a resulting image data record 967*a-n* to the image buffer 963; ii) cropping of an image frame (full, binned, cropped, or sub-sampled) and transfer of the resulting image data record 967*a-n* to the image buffer 963; iii) binning an image frame (full, binned, cropped, or sub-sampled) and transfer of the resulting image data record 967*a-n* to the image buffer 963; iv) subsampling an image frame (full, binned, cropped, or sub-sampled) and transfer of the resulting image data record 967*a-n* to the image buffer 963; v) generating a rotation of an image frame (full, binned, cropped, or sub-sampled) and transfer of the resulting image data record 967*a-n* to the image buffer 963; vi) generating a convolution of an image frame (full, binned, cropped, or sub-sampled) and transfer of the resulting image data record 967*a-n* to the image buffer 963; and vii) generating a double convolution which is a second sequential convolution performed on the result of a previously performed convolution of a an image frame (full, binned, cropped, or sub-sampled) and transfer of the resulting image data record 967*a-n* to the image buffer 963. Each sequential convolution utilizes a different distinct kernel. Each of these image processing operations is described in more detail herein.

The pre-processing circuits 965*a-n* may be implemented in hardware gate logic to provide for image processing very quickly such that processing by a pre-processing circuit 965*a-n*, and thereby generating, and storing in the image buffer 963, one or more image data records 967*a-n* may be performed during the limited amount of time that the image frame is being read from the photo sensor array 102 such that raw pixel data (i.e., digital intensity values from the A/D converters coupled to the image sensor array) do not need to be stored in memory (other than simple FIFO buffers) prior to being processed by the pre-processing circuits 965*a-n*.

Control Circuitry

The control circuitry 939 may be any combination of hardware gate logic and/or a processor executing a code stored in a volatile or non-volatile memory. The control circuitry 939 interfaces with the image decoding system 107, the pre-processing circuits 965*a-n*, and the photo sensor array 102.

In operation the control circuitry may receive, from the image decoding system 107 via interface 200, image capture parameter values for a burst of one or more image frames (full, binned, sub-sampled, and/or cropped) to be sequentially captured. As will be described in more detail herein, the image capture parameter values define, for the burst of one or more image frames to be captured by the photo sensor, a quantity of image frames to be sequentially captured (the burst of images) and, for each image within the burst: i) whether a full image frame, binned image frame, sub-sampled image frame, or a window of a full, binned, or sub-sampled image frame is to be captured; ii) the binning or subsampling resolution (vertically and horizontally) and/or window cropping, if applicable; iii) an exposure setting; iv) a gain setting; and v) an indication of a permutation of one or more pre-processing functions to apply to the image frame (full, binned, sub-sampled and/or windowed), including pre-processing functions that are to be applied to an image data record resulting from a previous pre-processing function being applied to the image frame (full, binned, sub-sampled, and/or windowed).

In further operation, after receiving the image capture parameter values, the control circuitry 939 may, for each image frame to be captured, set image capture settings to the image capture parameter values for the image frame and, in response to a trigger signal from the image decoding system 107, drive the photo sensor array 102 to sequentially capture each of one or more image frames of the burst in accordance with the image capture settings and without further trigger signal(s) from the image decoding system 107.

In more detail, the control circuitry 939 adjusts the image capture settings between the exposure periods for each sequentially captured image frame such that each captured image frame within the burst of image frames is captured with image capture settings specifically defined for that image frame by the image decoding system 107. At least one of the multiple frames of image data may be captured with a distinct value of at least one image capture parameter.

Each captured image frame (full, binned, sub-sampled, and/or windowed) may, under control of the control circuitry 939 be input to selected one or more pre-processing circuits 965*a-n* in accordance with the image capture parameter values for purposes of performing the pre-processing functions previously described. Resulting image data records 967*a-n* are written to the image buffer 963.

Further, the control circuitry 939 may, for selected image data records 967*a-n* in the image buffer 963, drive selected other pre-processing circuits 965*a-n* to receive the selected image data record 967*a-n* and generate, and write to the image buffer 963, an image data record 967*a-n* which is derived therefrom.

Further yet, the control circuitry 939 may, as requested by the image decoding system 107, provide certain image data records 967*a-n* (or portions of certain image data records 967*a-n*) to the image decoding system 107 for further processing and decode.

Image Capture

Circuitry within the image sensor system package 111 and/or the image decoding system 107 may control image capture by: i) defining (or receiving from the decoder 980) image capture parameter values for a burst of one or more image frames to be sequentially captured by the photo sensor array 102 of the image sensor system package 111 and the image processing to be performed on each image frame; ii) initiating the capture of the sequence of one or more image frames by the photo sensor array 102 and the corresponding performance of the image processing thereon by the pre-processing circuits 965*a-n* to generate image data records 967*a-n*, each of which is a derivative of an image frame within the sequence of one or more image frames; and iii) controlling the illumination system 103 to illuminate the barcode within the field of view during capture of each frame of the sequence of one or more image frames.

As described, the image capture parameter values may define a quantity of image frames to be sequentially captured (the burst of images) and, for each image within the burst: i) whether a full image frame, binned image frame, sub-sampled image frame, or a window of a full, binned, or subsampled image frame is to be captured; ii) the binning or subsampling resolution (vertically and horizontally) and/or the windowing cropping for the image frame to be captured if applicable; iii) an exposure setting; iv) a gain setting, v) an indication of a permutation of one or more previously described pre-processing functions to apply to the image frame (full, binned, sub-sampled, and/or cropped) by the image pre-processing circuits 965*a-n* within hardware circuits of the image sensor system package 111, including pre-processing functions that are to be applied to an image data records 967*a-n* resulting from a previous pre-processing function being applied to the image frame (full, binned, sub-sampled and/or cropped).

The exposure period may be the duration of time each pixel is exposed (i.e., the duration of time between the beginning of the exposure period and the end of the exposure period).

The gain setting may be a gain value implemented for ensuring that the pixel intensity values (or binned pixel intensity values) utilize the dynamic range of the A/D converters.

Initiating the capture of the sequence of one or more image frames of a barcode within a field of view of the photo sensor array 102 may include providing a single trigger signal to the control circuitry 939 of the image sensor system package 111 to initiate the capture of the sequence of one or more image frames. Such single trigger signal may be provided after the image capture parameter values defining the sequence of image frames to be captured and pre-processing to be performed by pre-processing circuits 965*a-n* within the image sensor system package 111 have been provided to the control circuitry 939 such that the control circuitry 939 may autonomously capture the sequence of image frames and drive the pre-processing circuits 965*a-n* to perform the applicable pre-processing in accordance with the image capture parameter values without further control having to be provided by the image decoding system 107.

Controlling the illumination system 103 to illuminate the barcode within the field of view during capture of each frame of the sequence of one or more image frames may comprise controlling illumination logic 954 within hardware circuits 950.

In more detail, the illumination system 103 is coupled to the hardware circuits 950 which provide power required for the light emitting diodes (LEDs) or other illumination sources to generate illumination under control of illumination logic 954. More specifically, for each image frame to be captured by the photo sensor array 102, illumination parameters may be provided to the illumination logic 954 which control the illumination settings to be used for capture of the image frame. More specifically, the illumination parameters may define such illumination settings as the intensity of illumination to be generated by the illumination system 103. In certain exemplary embodiments the intensity may be defined as: i) a percentage from zero percent (0%) to one hundred percent (100%) representing the percent of a maximum illumination intensity that can be generated by the LEDs (or other illumination sources) of the illumination system 103; ii) pulse-width-modulation (PWM) parameters representing the percentage of time during the exposure period that maximum operating power is applied to the LEDs (or other illumination sources) of the illumination system 103 in a pulsing pattern; and iii) a percentage greater than one hundred percent (100%) representing a power level to be applied if the LEDs of the illumination system 103 if the LEDs are to be over-driven.

In certain embodiments, the illumination parameters may be provided to the illumination logic 954 for one or more image frames within a burst of image frames to be captured by the photo sensor array 102. The illumination parameters for each frame may be written to a distinct register within the illumination logic 954.

During capture of each image frame of one or more image frames within a burst of image frames, the illumination logic 954 sets the illumination settings for the image frame to conform to the illumination parameters for the image frame by configuring power circuits of the hardware circuits 950 to apply the applicable power to the illumination system 103.

In one embodiment, the illumination logic is coupled to a flash signal generated by the control circuitry 939 of the image sensor system package 111 and output on a flash signal line 206. The flash signal is configured to generate a signal indicating a start of each exposure period and an end of each exposure period, for each image frame captured by the photo sensor array 102 within a burst of one or more image frames. In this embodiment the illumination logic may, for each image frame: i) set the illumination settings for the image frame to conform to the illumination parameters for the image frame by configuring power circuits of the hardware circuits 950 to apply the applicable power to the illumination system 103; ii) apply the applicable power to the illumination system 103 when the flash signal on the flash signal line 206 indicates start of the exposure period for the image frame; ii) deactivate the power to the illumination system 103 when the flash signal on the flash signal line 206 indicates the end of the exposure period; and iv) repeat steps i-iii for the next image frame within the sequence utilizing the illumination parameters for that next image frame within the sequence. The illumination parameters may be considered image capture parameter values in addition to those image capture parameter values previously described.

Decoder

The decoder 980, when executed by the processor 44, may determine which of the one or more image data records 967a-n (or windows within one or more image data records 967a-n) may be transferred from the image buffer 963 to the image decoding system 107. In addition, the decoder 980 may decode the barcode present within the field of view of the barcode reading system 100 and imaged within the one or more image frames (whether full, binned, or sub-sampled) captured by the photo sensor array 102 and represented by at least a portion of one of the image data records 967a-n derived from such image frame(s).

Figure 4:
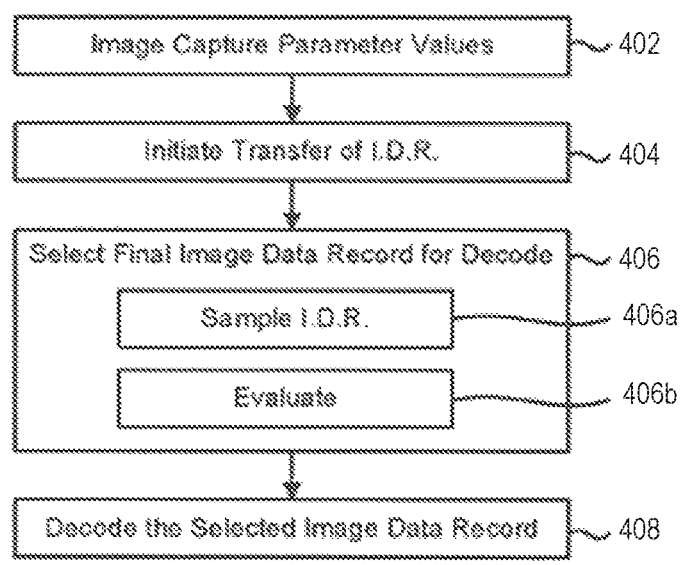
FIG. 4 illustrates an example of a method for decoding an image data record in accordance with one embodiment of the present disclosure.

Referring to FIG. 4, exemplary operation of the decoder 980 is depicted in accordance with one embodiment. Step 402 represents the decoder 980 determining the image capture parameter values for a burst of one or more image frames as previously described.

Step 404 represents transferring one or more image data records 967a-n (or portions of one or more image data records 967a-n) from the image buffer 963 to the image decoding system 107 and establishing which, if any, pre-processing functions are to be performed by image pre-processing circuits 951a-n.

Step 406 represents selecting an image data record 967a-n for decoding, which may include sampling final image data records 967a-n at step 406a and evaluating the sampled image data records 967a-n at step 406b.

Step 408 represents decoding the selected image data record. This operation may include, based on the resulting image data records 967a-n meeting or failing to meet certain criteria: i) driving image pre-processing circuits 951a-n to perform additional image processing operations, as previously described on one or more of the image data records 967a-n (or on a window of, a binning of, or a sub-sampling of each of one or more image data records 967a-n) and write resulting additional, or replacement, image data records 967a-n to the buffer memory; ii) driving the transfer of one or more additional image data records 967a-n (full, windowed, binned, or sub-sampled) to the image decoding system 107 (without obtaining an additional burst of one or more image frames) and, optionally driving performance of additional pre-processing operations on the additional image data records 967a-n by the pre-processing circuits 951a-n; and/or iii) driving capture of one or more additional bursts of image frames (whether full, windowed, binned or sub-sampled), resulting in one or more additional image data records 967a-n being written to the image buffer 963, and then driving transfer of one or more of the additional image data records 967a-n (full, windowed, binned or sub-sampled), but not necessarily all of the additional image data records 967a-n in the image buffer 963, to the image decoding system 107 and, optionally driving performance of additional pre-processing operations on the additional image data records 967a-n by the pre-processing circuits 951a-n. This aspect of the operation may be repeated until at least one of the image data records 967a-n is decodable by the processor 44 operating the decoder 980.

Pre-Processing Circuits 951

The pre-processing circuits 951a-n, similar to pre-processing circuits 965a-n may be implemented within hardware circuits 950. The pre-processing circuits 951a-n may perform operations such as convolution, binning, sub-sampling and other image processing functions on image data records 967a-n (each of which is provided by the image sensor system package 111 via the interface 200 and each of which is, or is a derivative of, an image frame (full, binned, sub-sampled, and/or cropped) captured by the photo sensor array 102) to generate one or more image data records 967a-n.

Each pre-processing circuit 951a-n may receive as input either: i) an image data record 967a-n (or a window of, a binning of, or a sub-sampling of, an image data record 967a-n) directly from the image sensor system package 111 by way of the interface 200; or ii) an image data record 967a-n from a buffer memory which is the result of a different pre-processing circuit 951a-n previously operating on an image data record 967a-n (or a window of, a binning of, or a sub-sampling of, an image data record 967a-n) received from the image sensor system package 111 by way of the interface 200.

It should be noted that one image data record 967a-n (or a window of, a binning of, or a sub-sampling of, an image data record 967a-n) may be input to multiple pre-processing circuits 951a-n, resulting in multiple image data records 967a-n being written to the buffer memory for the same image data record 967a-n (or a window of, a binning of, or a sub-sampling of, an image data record 967a-n).

Further, for a burst of multiple image frames the image data record 967a-n (or a window of, a binning of, or a sub-sampling of, an image data record 967a-n) received and processed by the pre-processing circuits 951a-n may represent different image frames within the burst captured by the photo sensor array 102. The image data records 967a-n (or a window of, a binning of, or a sub-sampling of, an image data record 967a-n) received and processed by the pre-processing circuits 951a-n may be the result of applying the same pre-processing functions by pre-processing circuits 965a-n to each of multiple image frames within the burst.

Each image data record 967a-n (or a window of, a binning of, or a sub-sampling of, an image data record 967a-n) received may be input to the same one or more pre-processing circuits 951a-n or may be input to different subsets of pre-processing circuits 951a-n, each subset including one or more pre-processing circuits 951a-n.

It should also be noted that one of the pre-processing circuits 951a-n may simply write the image data record 967a-n (which may be an image frame captured by the photo sensor array 102 (full, binned, sub-sampled, and/or cropped) without previous processing by pre-processing circuits 965a-n) to the buffer memory without performing substantive image processing.

Referring again to FIG. 7, operations performed by, and derivatives of the frame of image data produced by, the pre-processing circuits 951a-n may include: i) transfer of the image data record 967a-n (or a window, binning, or sub-sampling of the image data record 967a-n) to the buffer memory as an image data record 967a-n without substantive processing; ii) binning of an image data record 967a-n (or a window or sub-sampling of the image data record 967a-n) and writing the result to the buffer memory as an image data record 967a-n; iii) subsampling of an image data record 967a-n (or a window, binning, or sub-sampling of the image data record 967a-n) and writing the result to the buffer memory as an image data record 967a-n; iv) generating a rotation of an image data record 967a-n (or a window of, a binning of, or sub-sampling of the image data record 967a-n) and writing the result to the buffer memory as an image data record 967a-n; v) generating a convolution of an image data record 967a-n (or a window or sub-sampling of the image data record 967a-n) and writing the result to the buffer memory as an image data record 967a-n; and vi); generating a double convolution, which is a second sequential convolution performed on the result of a previously performed convolution, of an image data record 967a-n (or a window or sub-sampling of the image data record 967a-n) and writing the result to the buffer memory as an image data record 967a-n. Each sequential convolution utilizes a different distinct kernel.

The pre-processing circuits 951a-n may be implemented in hardware circuits 950 to provide for image processing very quickly such that processing by a pre-processing circuit 951a-n, and thereby generating, and storing in the buffer memory, one or more image data records 967a-n may be performed during the limited amount of time that the image data records 967a-n are being transferred to the image decoding system 107 via the interface 200 without requiring storage of the transferred image data records 967a-n in memory prior to pre-processing by pre-processing circuits 951a-n.

Interface 200

As discussed, the image sensor system package 111 and the image decoding system 107 may be included in two separate packages communicating over the interface 200.

Figure 2C:
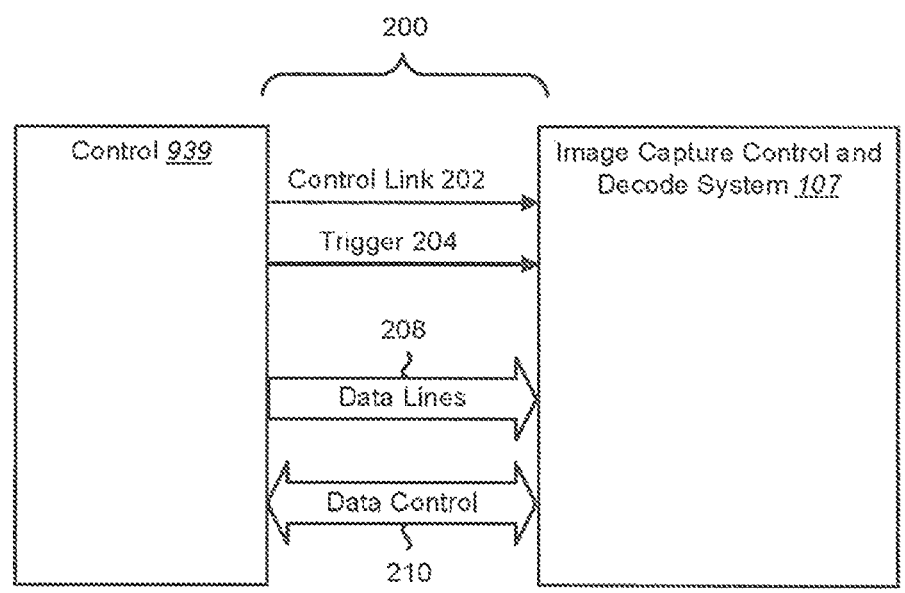
FIG. 2C shows an example of an interface between the control circuitry in the image sensor system package and the image decoding system.

FIG. 2C shows the interface 200 between the image sensor system package 111 and the image decoding system 107. The interface 200 may comprise a control link 202 that may be a two-way serial control channel enabling the image decoding system 107 to: i) set parameters (e.g., the quantity of images to be captured in a burst, exposure period for each frame, gain setting for each frame, resolution setting for each frame, or the like); ii) select which image pre-processing circuits 965a-n are to be applied to each captured frame, thereby determining the characteristics of the image data records 967a-n written to the image buffer 963; and iii) select image data records 967 for transfer to the image decoding system 107.

The interface 200 may further include a trigger signal line 204 controlled by the image decoding system 107 to initiate autonomous capture of a burst of one or more image frames and subsequent image pre-processing and writing of image data records 967a-n to the image buffer 963.

The interface 200 may further include a flash signal line 206 which is output by the image sensor system package 111 to signal the start of each exposure period and the end of each exposure period. The image decoding system 107 may control the illumination system 103 based on the flash signal on the flash signal line 206. More particularly, the image decoding system 107 may activate the illumination system 103 at the selected intensity during the exposure of each applicable frame based on the flash signal line 206 indicating start of the exposure period. The illumination system 103 may be configured to deactivate the exposure illumination when the flash signal line 206 indicates end of the exposure period activate the targeting illumination during the time period between exposure periods of sequential frames.

The interface 200 may further include data lines 208 that may be parallel or serial and that provide for the transfer of image data records 967 from the image sensor system package 111 to the image decoding system 107.

The interface 200 may further include data control signals 210 which may be signals to indicate the time each pixel value is valid on a data line, and indicate location of the pixel within the image array represented by the image data records (e.g., horizontal blanking, vertical blanking).

It should be appreciated that the barcode image is captured, processed, and stored in the first package (i.e., the image sensor system package 111) at a much faster speed and may then be transferred to the second package (the image decoding system 107) for decoding at a slower speed. The image buffer 963 may be large enough to hold an entire frame of image data (in combination with image data records 967a-n derived from the frame of image data), and the entire frame of image data and/or combinations of one or more image data records 967a-n may be read-out of the image buffer 963 after the entire frame of image data is put into the image buffer 963.

In one embodiment, instead of transferring all frames of image data captured in a burst, a subset of the multiple frames of image data generated in a burst may be transferred to the image decoding system 107 at a speed commensurate with transfer by the interface 200 via the second or slower speed.

Operation

Figure 3:
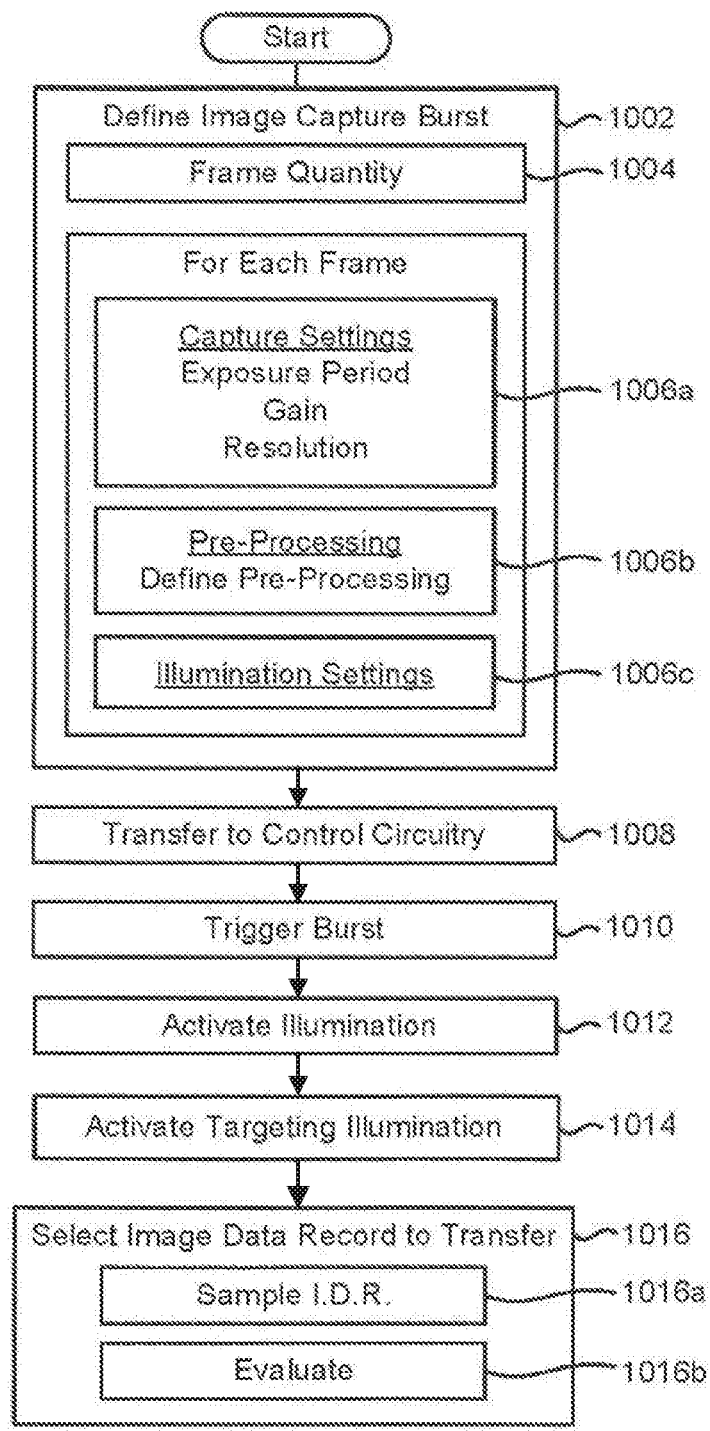
FIG. 3 illustrates an example of a method for selecting an image data record in accordance with one embodiment of the present disclosure.

Referring to FIG. 3 in conjunction with FIGS. 1A and 2A-2C, an exemplary operation of certain components of the barcode reader are represented in accordance with an embodiment of the present invention.

Step 1002 represents defining image capture parameter values for a burst of image frames to capture. In more detail, defining the image capture parameter values may comprise the decoder 980 defining the quantity of image frames to capture (full, binned, sub-sampled, and/or windowed) in sequence at sub-step 1004 and for each frame in the sequence, defining: i) image capture parameter values for the image frame such as the exposure period, gain settings, and/or resolution settings (if capturing a binned or sub-sampled image frame) at sub-step 1006a; ii) the image processing functions to which the image frame will be subject by pre-processing circuits 965a-n for purposes of defining the image data records 967a-n to be written to the image buffer 963 at sub-step 1006b; and/or iii) the illumination settings for the image frame at sub-step 1006c.

Step 1008 represents: i) transferring the image capture parameter values for the image capture burst to the control circuitry 939 of the image sensor system package 111 utilizing the bi-directional control link 202 of the interface 200; and ii) configuring the illumination logic to drive the illumination system 103 in accordance with the illumination parameters during an exposure time for capture of each image frame. It should be appreciated that image capture parameter values transferred to the control circuitry 939 do not need to include parameter values related to illumination when illumination is controlled by hardware logic 954 within the image decoding system 107. However, in an embodiment wherein the illumination logic 954 controlling the illumination system 103 is within the image sensor system package 111, then illumination parameter values may be transferred to the control circuitry 939.

Step 1010 represents driving the single trigger signal to the control circuitry 939 to initiate capture of the burst of one or more image frames, and subsequent image pre-processing and writing of image data records 967a-n to the image buffer 963 which, as discussed may be without further control by the image decoding system 107.

Step 1012 represents the illumination logic 954 receiving from the control circuitry 939 of the image sensor system package 111, for each image frame of the burst, a flash signal 1012a-c indicative of the exposure period commencement and termination for the image frame and activating the illumination system 103 in accordance with the illumination settings applicable to that image frame as defined at step 1006c.

Step 1014 represents activating targeting illumination after capturing the burst of image frames for purposes of projecting a targeting pattern of illumination into the field of view to assist the operator of the barcode reader in maintaining the desired barcode within the field of view of the barcode reader in case an additional burst of one or more image frames is required. After the barcode within the field of view has been decoded the targeting illumination may be deactivated.

Step 1016 represents selecting which image data records 967*a-n* (or selected portions or windows within each image data record 967*a-n*) are to be transferred from the image buffer 963 to the image decoding system 107. More specifically, the decoder 980 may obtain portions (e.g., samples) of one or more image data records 967*a-n* at sub-step 1016*a* and evaluate each for the quality of the image of the barcode within the image data record at sub-step 1016*b* to select one or more image data records 967*a-n*, but fewer than all image data records 967*a-n*, to transfer from the image buffer 963 to the image decoding system 107 for decoding.

The image data records 967*a-n* being transferred may have the best quality image of the barcode or other characteristics of the image of the barcode which are likely to result in a decodable barcode image. For example, the quality of an image of a barcode may be measured in terms of the contrast between light cells and dark cells within the barcode. A barcode image having relatively high contrast between dark cells and light cells may be considered to have higher quality than a barcode image having relatively low contrast between dark cells and light cells.

The superior contrast profile may mean at least one of: (i) greater maximum amplitude between the portions of the image within the subset that are dark marks of the barcode and the portions of the image within the subset that are light marks of the barcode; and (ii) more distinct transitions between portions of the image within the subset that are dark marks of the barcode and the portions of the image within the subset that are light marks of the barcode.

The terms "dark cells" and "light cells" are used herein because barcodes have traditionally been printed with ink. This gives barcodes the appearance of having dark cells (the portion that is printed with ink) and light cells (the unprinted substrate background, typically white). However, with direct part mark technology, ink is not always used and other techniques (e.g., laser/chemical etching and/or dot peening) may be used instead. Such techniques may be utilized to create a barcode by causing different portions of a substrate to have different reflective characteristics. When these different portions of the substrate are imaged, the resulting barcode image may have the appearance of including dark cells and light cells. Therefore, as used herein, the terms "dark cells" and "light cells" should be interpreted as applying to barcodes that are printed with ink as well as barcodes that are created using other technologies.

The contrast between the dark cells and the light cells in a barcode may be a function of illumination. Ideally, it is desirable to provide illumination that is consistent across the barcode and of intensity such that the exposure of the image yields both dark cells and light cells that are within the dynamic range of the photo sensor array 102. This yields better contrast than any of the following: (i) a dimly lit barcode; (ii) a brightly lit barcode wherein the image is washed out beyond the dynamic range of the photo sensor array 102; (iii) an unevenly lit barcode with bright washed out spots; or (iv) a barcode illuminated with illumination that is not compatible with the reflectivity characteristic(s) of the cells of the barcode. An example of (iv) is that illumination directed from the sides of the field of view yields a higher contrast image of a barcode formed by etching technology than does illumination parallel to the optical axis.

Also, as previously discussed, one of the pre-processing circuits 965*a-n* may simply write input data as an image data record 967*a-n* to the image buffer 963 without additional substantive processing.

As such, the structure depicted in FIG. 1A and FIG. 2A enables an image frame, as captured by the photo sensor array 102, to be written as an image data record 967 to image buffer 963 without substantive processing then subsequently transferred to the image decoding system 107 where it either: i) undergoes image pre-processing by one or more pre-processing circuits 951*a-n*, resulting in one or more image data records 967*a-n* being written to the image buffer as a result of such pre-processing; or ii) is written to the image buffer as an image data record 967*a-n* without pre-processing by either the pre-processing circuits 965*a-n* or the pre-processing circuits 951*a-n*.

The structure depicted in FIG. 1A and FIG. 2A also enables an image frame, as captured by the photo sensor array 102, to undergo image pre-processing utilizing one or more pre-processing circuits 965*a-n* and to be written to the image buffer 963 as one or more image data records 967*a-n* and then have one or more of the image data records 967*a-n* transferred to the image decoding system 107 where the transferred image data records 967*a-n* are: i) written to the image buffer as image data records 967*a-n* without further pre-processing; or ii) subjected to further pre-processing by image pre-processing circuits 951*a-n*, resulting in writing of image data records 967*a-n* to the image buffer.

Preprocessing

Examples of pre-processing will be explained hereafter. The following examples of pre-processing may be: i) performed by the pre-processing circuits 965*a-n* on a frame of image data received from the photo sensor array 102 to generate image data records 967*a-n*, which are the image frame or a derivative of the image frame, to be written to the image buffer 963; ii) performed by the pre-processing circuits 951*a-n* on an image data record 967*a-n* transferred from the image buffer 963 to the image decoding system 107 for generating an image data record 967*a-n* which may be the original image frame or a derivative of the original image frame.

Preprocessing Example A

In one embodiment, no image processing may be performed such that the image data record may be the image frame (whether full, windowed, binned, or sub-sampled) without substantive processing.

Preprocessing Example B

In another embodiment, portions of the image frame may be cropped horizontally or vertically such that the image data record may be a windowed portion of the image frame (whether full, binned or sub-sampled).

Preprocessing Example C

In another embodiment, the image data record may be a lower resolution frame of the original image data. One of the pre-processing circuits may bin, or average, two or more pixel intensity values to generate a single intensity value representative of a theoretical pixel that encompasses the size of all of the pixels that provided values that were binned or averaged. Multiple image data records can be generated from the same frame of image data at different resolutions. Referring to FIG. 5A: i) 220 represents binning four pixels (e.g., averaging the four intensity values) to reduce the resolution to 25% of the resolution of the input image; ii) 222 represents vertical binning of two pixels to reduce vertical resolution by 50% without affecting horizontal resolution; and iii) 224 represents horizontal binning of two pixels to reduce horizontal resolution by 50% without affecting vertical resolution. It should be noted that FIG. 5A shows examples only and the binning may include any other grouping of pixels for resolution reduction.

Preprocessing Example D

In another embodiment, binarization may be performed. The binarization may involve comparing the intensity value of each pixel, or the intensity value resulting from the binning of a group of pixels, to a threshold. If it is greater than (or equal to) the threshold, the intensity value may be converted to a first binary value, and if it is less than (or equal to) the threshold, the intensity value may be converted to a second binary value. The threshold may be common across all pixels (or binned pixel groupings) or may be different for different pixels (or binned pixel groupings). The threshold value applied to any pixel (or binned pixel groupings) may be dynamic (e.g., the threshold value may be calculated based on the intensity values previously operated on during the binarization process).

Preprocessing Example E

In another embodiment, a minimum/maximum processing technique may be applied to any array of pixel intensity values or any array of binned or subsampled array of intensity values. It may be applied across the entire frame of image data (or an image data record) or to only a cropped section of the frame of image data (or an image data record). Referring to FIG. 5B, an exemplary 3×3 kernel 230 encompasses 9 pixel intensity values (or 9 binned intensity values). Of those 9 intensity values, the maximum intensity value or the minimum intensity value is determined and written to the image data record in substitution for the intensity value of the center value 234 for kernel 230. The kernel is then shifted to the next center value 236 (represented by kernel 232, which is shown shifted up slightly for clarity) and the maximum or minimum value among the nine intensity values is calculated for replacement of intensity value 236.

Preprocessing Example F

In another embodiment, convolution kernel masking may be performed. In this image processing technique, a kernel mask, such as the 3×3 kernel mask 240 as shown in FIG. 5C as an example, may be applied to a 3×3 group of pixel intensity values (or a 3×3 group of binned intensity values) to determine an intensity value to replace the center intensity value. More specifically, each intensity value is multiplied by the mask value (in the example of FIG. 5C, the center intensity value is multiplied by 8 and each surrounding intensity value is multiplied by −1) and then the resulting 9 values are averaged to determine the intensity value to replace the center intensity value. The kernel is then shifted by one pixel as described with respect to FIG. 5B to determine the intensity value for the next pixel.

Preprocessing Example G

In another embodiment, a rotation may be performed as shown in FIG. 5D on an array of pixel values. More specifically, each intensity value for selected columns of the array (e.g. 3, 5, 7) may be extracted and used for intensity values of adjacent rows within an image data record. The selected columns may be adjacent columns or may be a fraction of the columns, evenly spaced, across all or a portion of the array. The array may be the image data (full, binned, sub-sampled, and/or windowed).

It should be appreciated that using one or more of the above processing techniques, image data records can be generated from the original image frame or image data records that have already been generated from the original image frame. Multiple processing techniques may be applied to the same frame of image data (or image data record) to result in different image data records derived therefrom, and the processing techniques may be applied in any order.

Sets of image data records may be generated from one or more image frames captured in a single sequence or in multiple sequences, and may be generated by a combination of the pre-processing circuits 965a-n of the image sensor system package 111 and the pre-processing circuits 951a-n of the image decoding system 107. For example, an image data record may be a frame of image data which may be an array of pixel intensity values, each pixel intensity value representing the intensity of illumination accumulating on the photo sensor pixel over the exposure period. Different image data records may each be a frame of image data captured using a different exposure period as shown in FIG. 6A, using a different gain setting, or using a different exposure period as shown in FIG. 6B. FIG. 6A shows, as an example, three image frames generated by using different exposure settings, respectively. FIG. 6B shows, as an example, four image frames that are generated using different exposure settings.

Referring to FIGS. 1 and 1A, in an exemplary embodiment, the operating system 48 may include an application retrieval system 49 which obtains the barcode-reading application 24 and the applications 50a, 50b from the application server 22a or 22b. In one embodiment, the operation of the application retrieval system 49, which may obtain the barcode-reading application 24 and the other applications 50a, 50b from the application server 22a or 22b, may be the exclusive means for loading, writing, or otherwise placing the barcode-reading application 24 and the other applications 50a, 50b into the memory 46. The operating system 48 may be configured to block or prevent loading of any applications to the memory 46 by any means other than the operation of the application retrieval system 49 in a manner such that the applications 24, 50a, 50b may be retrieved exclusively from the application server 22a or 22b.

As discussed above, the barcode reading system 100 shown in FIG. 1A includes a camera (including an optic system 104 and a photo sensor array 102) coupled to a decoder 980 (which is part of a barcode-reading application 24 that is stored in memory 46 and executed by the processor 44) via a communication interface 200. The interface 200 between the camera and the decoder 980 may be relatively slow. For example, the camera may be able to capture image frames much more quickly than the image frames can be transferred across the interface 200 to the decoder 980.

One aspect of the present disclosure is related to improving the overall performance of a barcode reading system 100 that includes a slow interface 200 between the camera and the decoder 980. For example, aspects of the present disclosure may be directed to improving the overall decoding speed in such a barcode reading system 100.

Generally speaking, in order to improve the overall decoding speed in a barcode reading system 100 that includes a slow interface 200 between the camera and the decoder 980, it may be desirable to reduce the transmission of poor quality (undecodable) image frames across the interface 200. In addition, it may be desirable to reduce the amount of processing that is performed on the host side (i.e., the image decoding system 107, including the decoder 980).

Figure 8:
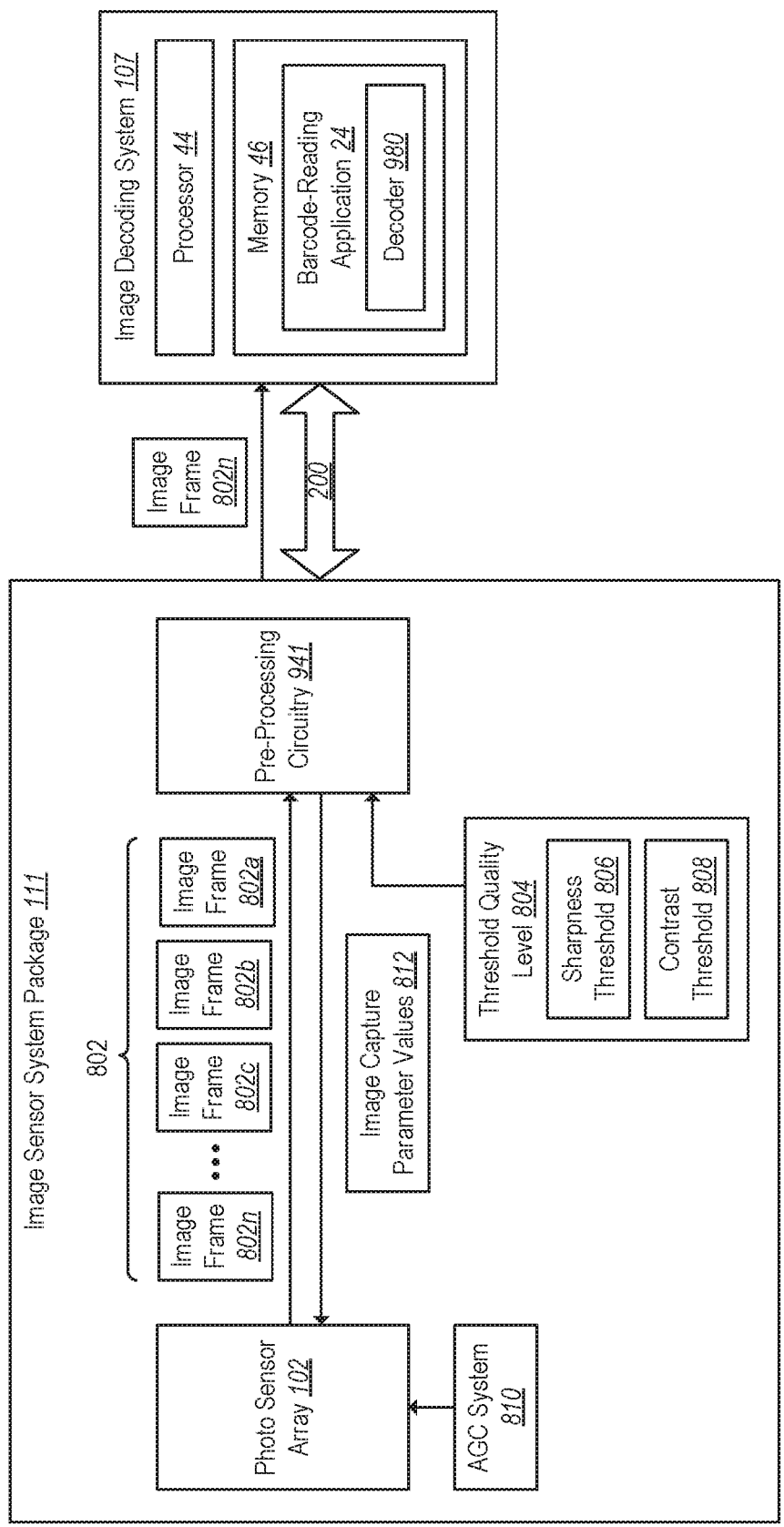
FIG. 8 illustrates an example of a barcode reading system that includes pre-processing circuitry configured to evaluate quality of image frames in accordance with the present disclosure.

Reference is made to FIG. 8. In accordance with one aspect of the present disclosure, the barcode reading system 100 may be configured so that only image frames 802 that meet a certain level of quality are transferred across the interface 200 to the decoder 980. For example, pre-processing circuitry 941 coupled to the camera may be configured to evaluate the quality of image frames 802 that are captured by the camera before those image frames 802 are transferred across the interface 200 to the decoder 980. The pre-processing circuitry 941 may be configured so that image frames 802 that meet a certain level of quality are transferred to the decoder 980, and image frames 802 that do not meet a certain level of quality are discarded without being transferred. In other words, the image frames 802 may be selectively transferred to the decoder 980 based on image quality.

In the barcode reading system 100 of FIG. 1A, the camera includes a photo sensor array 102, which is included in an image sensor system package 111. As discussed above, the pre-processing circuitry 941 may also be included in the image sensor system package 111. The pre-processing circuitry 941 may be coupled to the camera. In particular, the pre-processing circuitry 941 may be coupled to the photo sensor array 102 via the A/D converter 987 and the wide bus logic 955.

In the barcode reading system 100 of FIG. 1A, the decoder 980 is included in an image decoding system 107. In particular, the decoder 980 may be included in a barcode-reading application 24, which is stored in memory 46 and executed by the processor 44. As discussed above, the image sensor system package 111 and the image decoding system 107 may be included in two separate packages, each of which may include one or more silicon dies. The image sensor system package 111 may be coupled to the image decoding system 107 via the interface 200.

The pre-processing circuitry 941 may be configured to determine whether image frames 802 captured by the photo sensor array 102 satisfy a threshold quality level 804. The pre-processing circuitry 941 may also be configured to effect transfer of the image frames 802 that satisfy the threshold quality level 804 to the image decoding system 107, and to discard the image frames 802 that do not satisfy the threshold quality level 804 without transferring such image frames 802 to the image decoding system 107.

More specifically, instead of sending each image frame 802 that is captured by the photo sensor array 102 across the interface 200 to the image decoding system 107 to be processed by the barcode-reading application 24 (specifically, the decoder 980 within the barcode-reading application 24), the pre-processing circuitry 941 may evaluate the image frames 802 and only effect transfer of those image frames 802 that meet a threshold quality level 804. For example, if the pre-processing circuitry 941 determines that the first several image frames 802a-c captured by the photo sensor array 102 do not meet the threshold quality level 804, these image frames 802a-c may be discarded without being transferred across the interface 200 to the image decoding system 107. If, however, the pre-processing circuitry 941 determines that a subsequently captured image frame 802n meets the threshold quality level 804, the pre-processing circuitry 941 may effect transfer of this image frame 802n across the interface 200 to the image decoding system 107 to be processed by the decoder 980.

To determine whether an image frame 802 satisfies the threshold quality level 804, the pre-processing circuitry 941 may evaluate one or more characteristics of the image frame 802 and compare those characteristics to defined criteria. If the characteristics of the image frame 802 satisfy the defined criteria, then the pre-processing circuitry 941 may interpret this to mean that the image frame 802 satisfies the threshold quality level 804 and should be transferred to the image decoding system 107. If, however, the characteristics of the image frame 802 do not satisfy the defined criteria, then the pre-processing circuitry 941 may interpret this to mean that the image frame 802 does not satisfy the threshold quality level 804 and should be discarded instead of being transferred to the image decoding system 107.

In some embodiments, the pre-processing circuitry 941 may evaluate the contrast and/or the sharpness of the image frames 802 that are captured by the photo sensor array 102.

As used herein, the term "contrast" refers to the difference in brightness between different parts of an image frame. As discussed above, a barcode may include both light cells and dark cells. A barcode image having relatively high contrast between dark cells and light cells (i.e., a barcode image in which the difference in brightness between dark cells and light cells is significant) may be considered to have higher quality than a barcode image having relatively low contrast between dark cells and light cells (i.e., a barcode image in which the difference in brightness between dark cells and light cells is less significant).

As used herein, the term "sharpness" refers to the clarity of detail in an image frame. In the context of a barcode image, sharpness may refer to the amount of contrast at the edges between dark cells and light cells. A barcode image in which the edges between dark cells and light cells have relatively high contrast may be considered to possess greater sharpness than a barcode image in which the edges between dark cells and light cells have relatively low contrast. Moreover, a barcode image having a relatively high degree of sharpness may be considered to have higher quality than a barcode image having a relatively low degree of sharpness.

There are a variety of different methods that may be utilized to evaluate the contrast and/or sharpness of an image frame 802. In at least some of these methods, one or more metrics may be determined for the contrast and/or the sharpness of an image frame 802. These metrics may be compared to one or more thresholds.

In some embodiments, the pre-processing circuitry 941 may be configured so that it does not effect transfer of an image frame 802 to the image decoding system 107 unless i) the contrast of the image frame 802 exceeds a contrast threshold 808, and ii) the sharpness of the image frame 802 exceeds a sharpness threshold 806. Alternatively, the pre-processing circuitry 941 may be configured so that it effects transfer of an image frame 802 to the image decoding system 107 if either condition i) or condition ii) is satisfied.

The image sensor system package 111 may include an automatic gain control (AGC) system 810 that is capable of setting image capture parameter values 812 for the camera (including the photo sensor array 102). As discussed above, the barcode reading system 100 may be implemented in a device (e.g., a mobile device, such as a smartphone or tablet) that may be used for a variety of different purposes. The camera in such a device may be used to take photographs, capture video, etc. The AGC system 810 may be used to set the image capture parameter values 812 for the camera.

In some embodiments, the pre-processing circuitry 941 may, under some circumstances, set the image capture parameter values 812 for the camera instead of the AGC system 810. For example, the pre-processing circuitry 941 may set the image capture parameter values 812 for the camera when the camera is being used to read barcodes. The pre-processing circuitry 941 may set the image capture parameter values 812 based on its evaluation of image frames 802 captured by the photo sensor array 102. In other words, if one or more characteristics of an image frame 802 do not satisfy the criteria for being transferred to the image decoding system 107, then the pre-processing circuitry 941 may adjust the image capture parameter values 812 so that future image frames 802 will be more likely to satisfy the criteria. For example, if the pre-processing circuitry 941 determines that the sharpness and/or contrast of the image frames 802 do not meet the requisite thresholds 806, 808, the pre-processing circuitry 941 may adjust the gain and/or the exposure used by the photo sensor array 102 to capture future image frames 802.

It is not necessary, however, for the pre-processing circuitry 941 to set image capture parameter values 812 for the camera. In some embodiments, the pre-processing circuitry 941 may be configured so that it only evaluates and selectively transfers (or effects transfer of) image frames 802, without setting image capture parameter values 812. In such embodiments, the AGC system 810 in the image sensor system package 111 may set the image capture parameter values 812 for the camera.

In some embodiments, the image frames 802 may be compressed prior to being transferred across the communication interface 200. Compression quality can vary based on the frame rate. Generally speaking, it is desirable to have good compression quality at an acceptable frame rate (e.g., 5-10 frames per second).

There are several different ways that the pre-processing circuitry 941 may effect transfer of image frames 802 (specifically, those image frames 802 that satisfy the threshold quality level 804) to the image decoding system 107. In some embodiments, the pre-processing circuitry 941 may itself send the image frames 802 that satisfy the threshold quality level 804 to the image decoding system 107. In other embodiments, instead of directly sending the image frames 802 to the image decoding system 107, the pre-processing circuitry 941 may instead take some action that causes the image frames 802 to be sent to the image decoding system 107.

Figure 9:
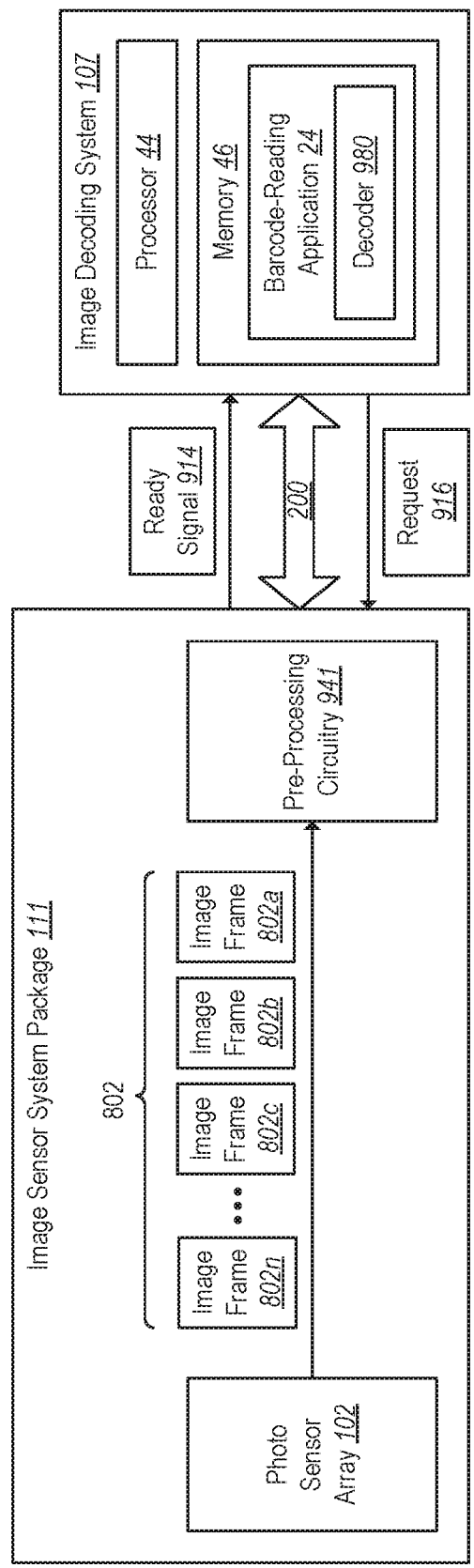
FIG. 9 illustrates an example showing how the pre-processing circuitry may effect transfer of image frames to the image decoding system in accordance with the present disclosure.

For example, referring to FIG. 9, in some embodiments the image decoding system 107 may be configured so that it only requests an image frame 802 from the image sensor system package 111 in response to receiving a ready signal 914. In embodiments where the image decoding system 107 is configured in this manner, the pre-processing circuitry 941 may effect transfer of an image frame 802 to the image decoding system 107 by sending a ready signal 914 to the image decoding system 107.

Reference is again made to the example considered previously, where the pre-processing circuitry 941 determines that the first several image frames 802*a-c* captured by the photo sensor array 102 do not meet the threshold quality level 804. These image frames 802*a-c* may be discarded without sending a ready signal 914 to the image decoding system 107. Once the pre-processing circuitry 941 determines that an image frame 802*n* meets the threshold quality level 804, the pre-processing circuitry 941 may send a ready signal 914 to the image decoding system 107. In response to receiving the ready signal 914, the image decoding system 107 may send a request 916 to the image sensor system package 111 for the image frame 802*n*. Both the ready signal 914 and the request 916 may be sent via the interface 200.

Figure 10:
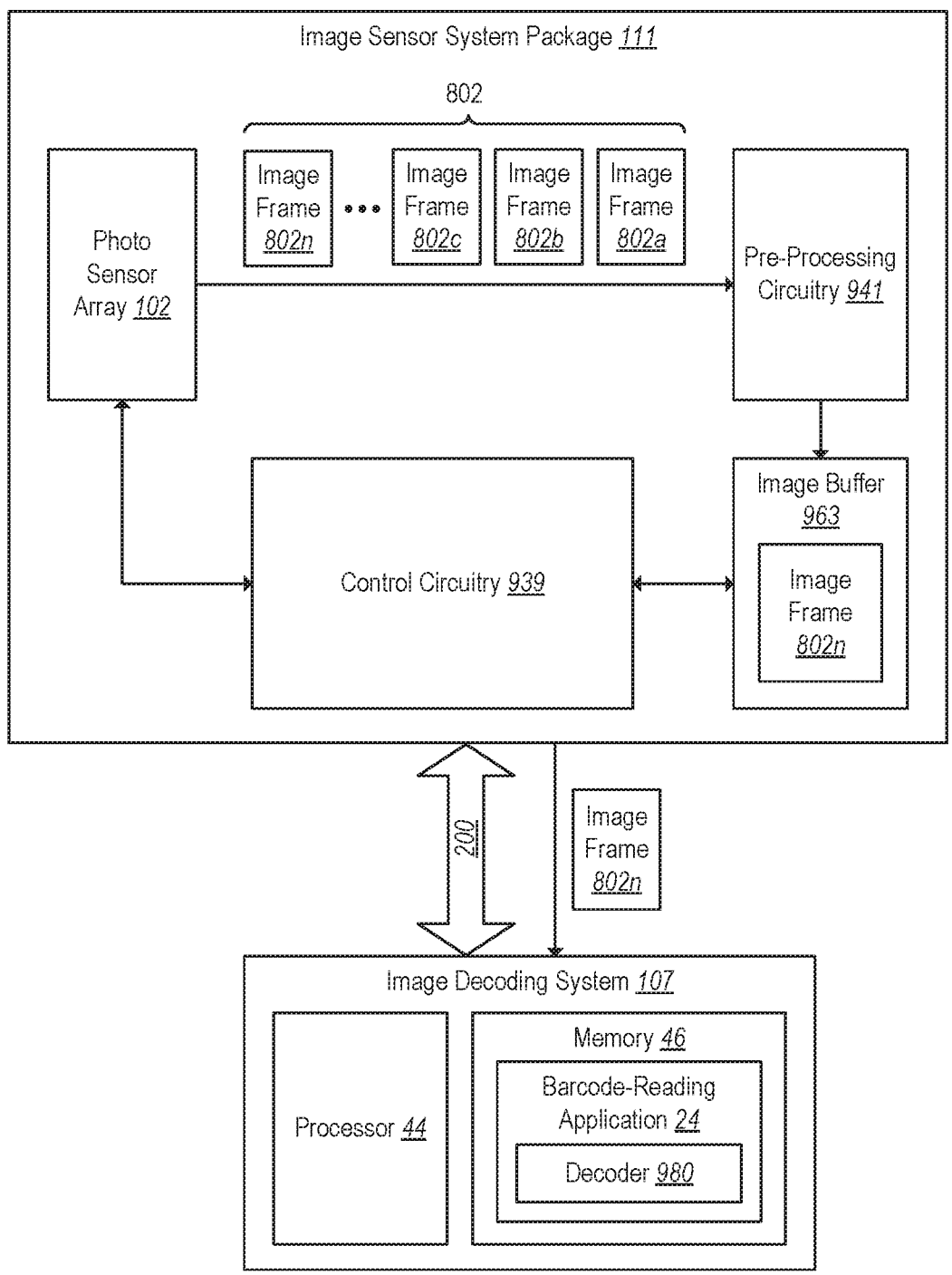
FIG. 10 illustrates another example showing how the pre-processing circuitry may effect transfer of image frames to the image decoding system in accordance with the present disclosure.

Another possible approach for effecting transfer of image frames 802 to the image decoding system 107 will be discussed in relation to FIG. 10. As discussed previously, the image sensor system package 111 may include control circuitry 939 and an image buffer 963. In some embodiments, the control circuitry 939 may be configured so that it transfers any image frames 802 that are stored in the image buffer 963 to the image decoding system 107. In embodiments where the control circuitry 939 is configured in this manner, the pre-processing circuitry 941 may effect transfer of an image frame 802 to the image decoding system 107 by simply transferring the image frame 802 to the image buffer 963.

Reference is again made to the example considered previously, where the pre-processing circuitry 941 determines that the first several image frames 802*a-c* captured by the photo sensor array 102 do not meet the threshold quality level 804. These image frames 802*a-c* may be discarded without being transferred to the image buffer 963. Once the pre-processing circuitry 941 determines that an image frame 802*n* meets the threshold quality level 804, the pre-processing circuitry 941 may transfer this image frame 802*n* to the image buffer 963. When the control circuitry 939 detects the image frame 802*n* in the image buffer 963, the control circuitry 939 may, in response, transfer the image frame 802*n* to the image decoding system 107 across the interface 200.

Figure 11:
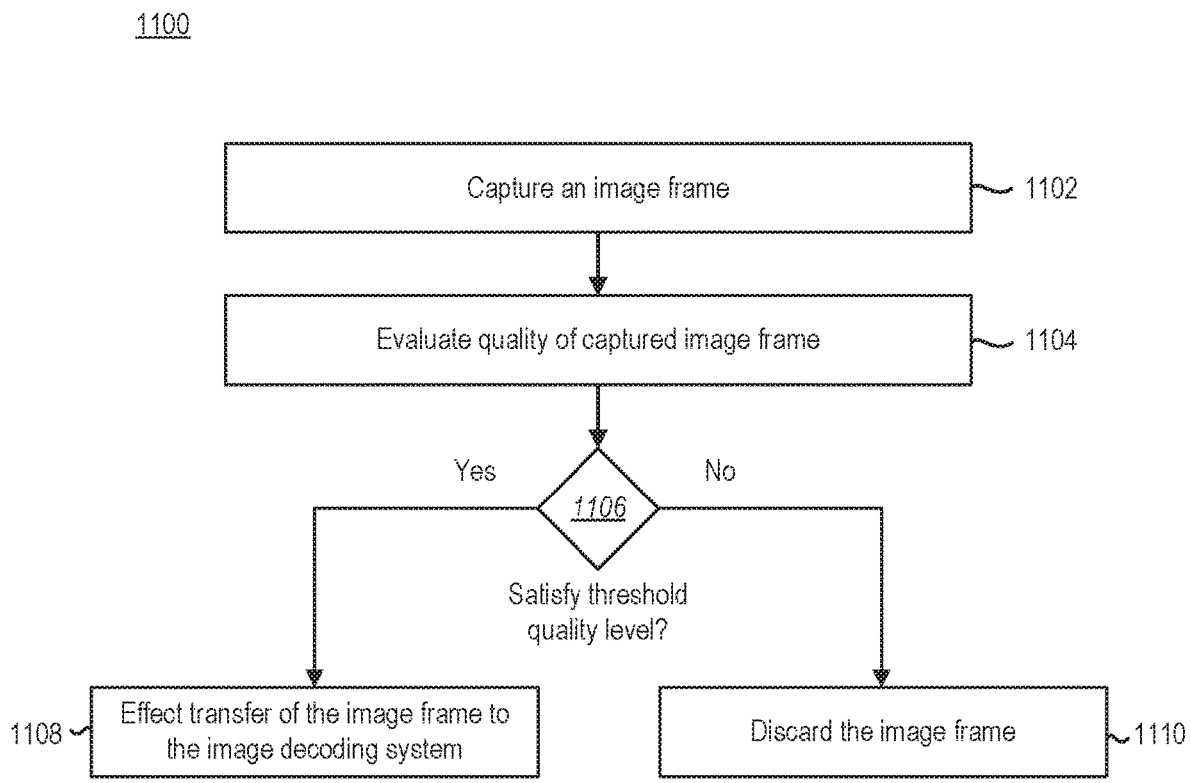
FIG. 11 illustrates a method for improving decoding speed in a barcode reading system that includes a slow interface between the camera and the decoder.

FIG. 11 illustrates a method 1100 for improving decoding speed in a barcode reading system 100 that includes a slow interface 200 between the camera (including an optic system 104 and a photo sensor array 102) and the decoder 980. For the sake of simplicity, the method 1100 will be described in relation to the capture of a single image frame 802. However, a camera in a barcode reading system 100 typically captures many image frames 802 in rapid sequence. The operations shown in the depicted method 1100 may be performed for multiple image frames 802. In some embodiments, the operations shown in the depicted method 1100 may be performed for each image frame 802 that is captured by the camera.

In accordance with the method 1100, the camera may capture 1102 an image frame 802. Pre-processing circuitry 941 may evaluate 1104 the quality of the captured image frame 802. More specifically, the pre-processing circuitry 941 may determine 1106 whether the image frame 802 satisfies a threshold quality level 804. For example, as discussed above, the pre-processing circuitry 941 may evaluate 1104 one or more characteristics of the image frame 802 (e.g., sharpness, contrast) and compare those characteristics to defined criteria (e.g., a sharpness threshold 806, a contrast threshold 808).

If the image frame 802 satisfies the threshold quality level 804, then the pre-processing circuitry 941 effects transfer 1108 of the image frame 802 across the interface 200 to the image decoding system 107. More specifically, the pre-processing circuitry 941 effects transfer 1108 of the image frame 802 to the decoder 980. The pre-processing circuitry 941 may either directly send the image frame 802 to the decoder 980, or the pre-processing circuitry 941 may instead take some action that causes the image frames 802 to be sent to the decoder 980. The method 1100 then returns to capturing 1102 another image frame 802, and proceeds as described above.

If, however, the pre-processing circuitry 941 determines 1106 that the image frame 802 does not satisfy the threshold quality level 804, then the pre-processing circuitry 941 discards 1110 the image frame 802 without effecting transfer of the image frame 802 to the decoder 980. The method 1100 then returns to capturing 1102 another image frame 802, and proceeds as described above.

Figure 12:
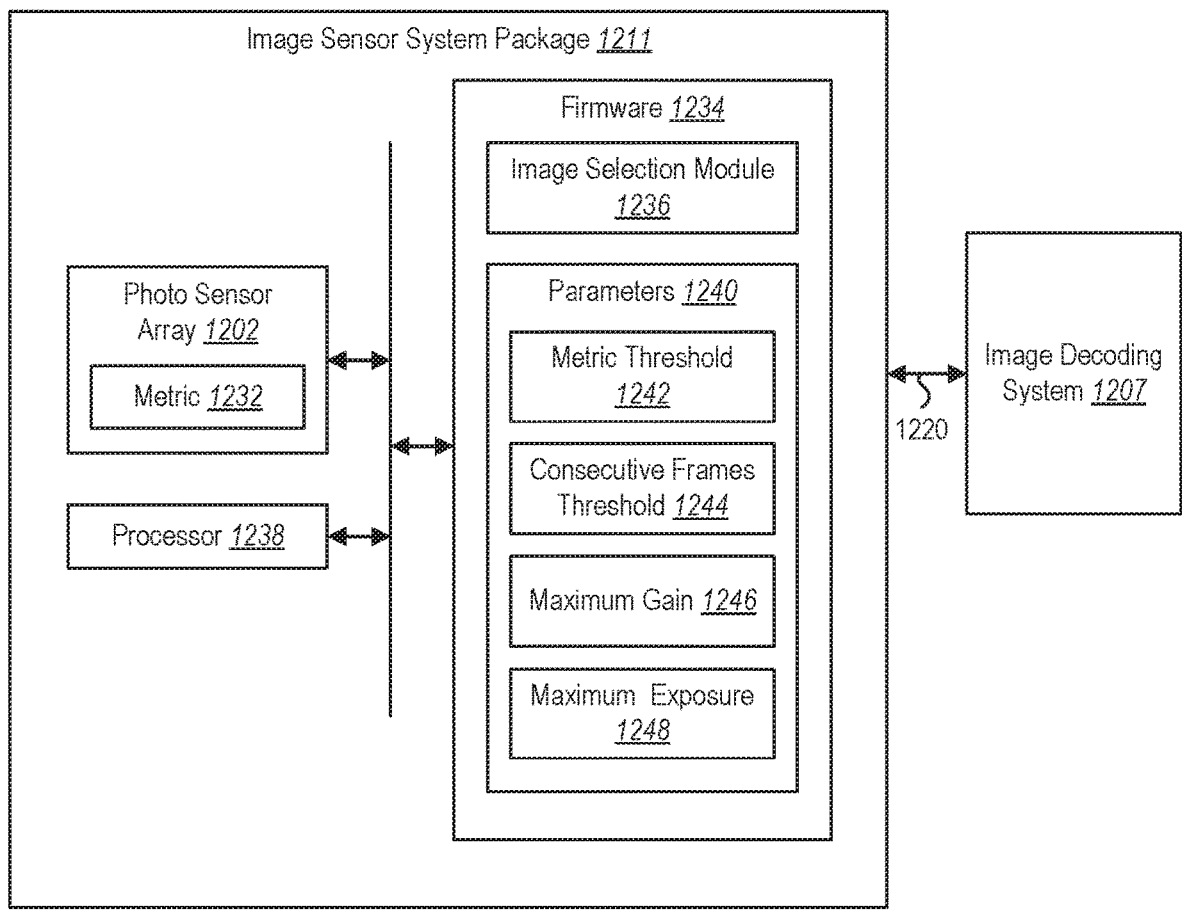
FIG. 12 illustrates another embodiment of a barcode reading system in accordance with the present disclosure.

FIG. 12 illustrates another embodiment of a barcode reading system 1200 in accordance with the present disclosure. The barcode reading system 1200 is similar in some respects to the barcode reading system 100 described previously. For example, the barcode reading system 1200 includes an image sensor system package 1211 having a photo sensor array 1202. The barcode reading system 1200 also includes an image decoding system 1207. The image decoding system 1207 may be configured similarly to the image decoding system 107 discussed previously. The image sensor system package 1211 may be coupled to the image decoding system 1207 via a communication interface 1220, which may be similar to the communication interface 200 described previously.

Like the image sensor system package 111 in the barcode reading system 100 described previously, the image sensor system package 1211 may include circuitry configured to determine whether image frames 802 captured by the photo sensor array 1202 satisfy a threshold quality level. However, instead of using pre-processing circuitry 941 to implement this functionality, a metric 1232 that is provided by the photo sensor array 1202 may be utilized.

The metric 1232 may be a measure of a characteristic of an image frame 802 captured by the photo sensor array 1202 (e.g., the most recently captured image frame 802). The metric 1232 may be updated each time the photo sensor array 1202 captures a new image frame 802. The image sensor system package 1211 may include an image selection module 1236 that is configured to read and evaluate the metric 1232. The image selection module 1236 may be included within firmware 1234 and executed by a processor 1238.

The firmware 1234 may also include several parameters 1240 that may be used by the image selection module 1236 in connection with evaluating the metric 1232. These parameters 1240 may include a metric threshold 1242, a consecutive frames threshold 1244, a maximum gain 1246, and a maximum exposure 1248. These parameters 1240 will be discussed in greater detail in connection with FIGS. 13 and 14.

Figure 13:
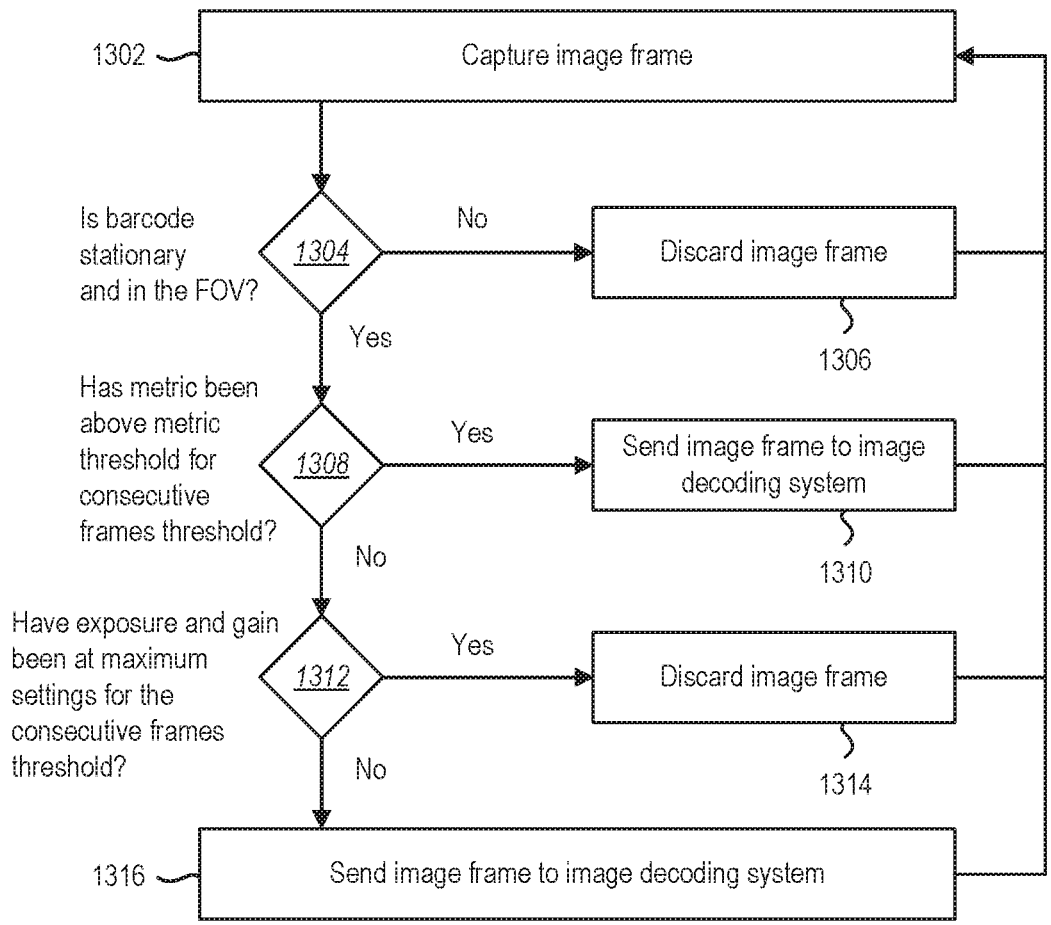
FIG. 13 is a flow diagram that illustrates a method for using a metric provided by the photo sensor array to determine whether image frames captured by the photo sensor array satisfy a threshold quality level.

FIG. 13 is a flow diagram that illustrates a method 1300 for using a metric 1232 provided by the photo sensor array 1202 to determine whether image frames 802 captured by the photo sensor array 1202 satisfy a threshold quality level. The image selection module 1236 may be configured to implement this method 1300. The method 1300 may be implemented when the photo sensor array 1202 is in a continuous capture mode such that the photo sensor array 1202 is continuously capturing image frames 802.

In accordance with the method 1300, an image frame 802 may be captured 1302. In response to capturing 1302 the image frame 802, a determination may be made 1304 about whether the image frame 802 includes a barcode within the field of view and the barcode is stationary (not blurry). If the image frame 802 does not include a barcode within its field of view, or the barcode is not stationary, then the image frame 802 may be discarded 1306. The method 1300 may then return to capturing 1302 another image frame 802.

If, however, it is determined 1304 that the image frame 802 includes a barcode within the field of view and the barcode is stationary, then a determination may be made 1308 about whether the metric 1232 has been above a defined metric threshold 1242 for a certain number of consecutive image frames 802 (as defined by a consecutive frames threshold 1244). If it has, then it may be concluded that the image frame 802 satisfies the threshold quality level, and the image frame 802 may be sent 1310 to the image decoding system 1207. The method 1300 may then return to capturing 1302 another image frame 802.

If the metric 1232 has not been above the metric threshold 1242 for the consecutive frames threshold 1244, then a determination may be made 1312 about whether the exposure and gain settings of the photo sensor array 1202 have been at their maximum values (the maximum gain 1246 and the maximum exposure 1248) for the consecutive frames threshold 1244. If not, the image frame 802 may be discarded 1314, and the method 1300 may return to capturing 1302 another image frame 802. If, however, the exposure and gain settings of the photo sensor array 1202 have been at their maximum values for the consecutive frames threshold 1244, then the image frame 802 may be sent 1316 to the image decoding system 1207. The method 1300 may then return to capturing 1302 another image frame 802.

Figure 14:
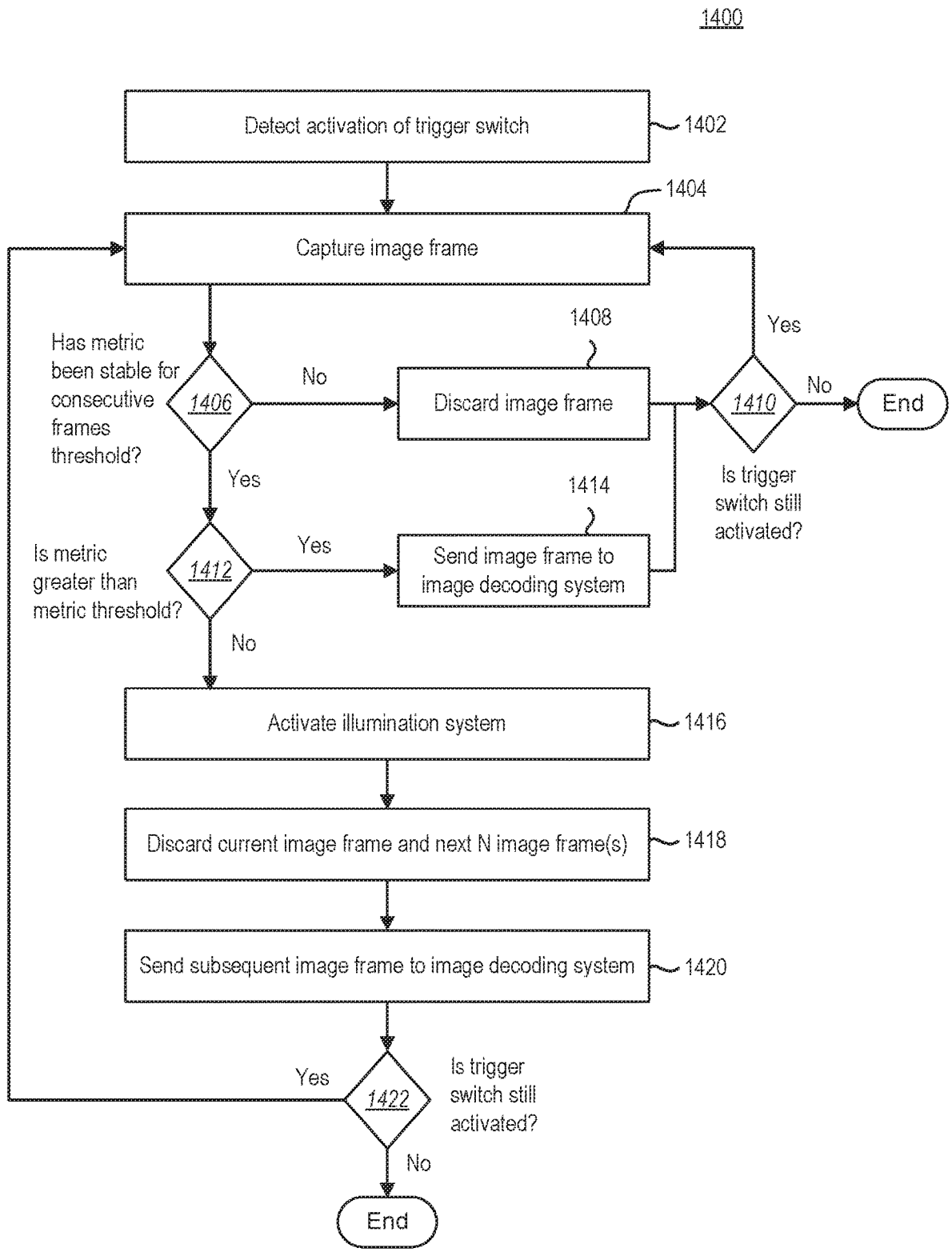
FIG. 14 is a flow diagram that illustrates another method for using a metric provided by the photo sensor array to determine whether image frames captured by the photo sensor array satisfy a threshold quality level.

FIG. 14 is a flow diagram that illustrates another method 1400 for using a metric 1232 provided by the photo sensor array 1202 to determine whether image frames 802 captured by the photo sensor array 1202 satisfy a threshold quality level. The image selection module 1236 may be configured to implement this method 1400. The method 1400 may be implemented when the photo sensor array 1202 is in a mode wherein it does not capture an image frame 802 unless a trigger switch 942 within the barcode reading system 1200 is activated.

In accordance with the method 1400, activation of a trigger switch 942 may be detected 1402. In response, an image frame 802 may be captured 1404. In response to capturing 1404 the image frame 802, a determination may be made 1406 about whether the metric 1232 has been stable (e.g., within a defined range of values) for a certain number of consecutive image frames 802 (as defined by the consecutive frames threshold 1244). If not, then the image frame 802 may be discarded 1408. If it is determined 1410 that the trigger switch 942 is still activated, the method 1400 may then return to capturing 1404 another image frame 802. Otherwise, the method 1400 may end.

If, however, it is determined 1406 that the metric 1232 has been stable for the consecutive frames threshold 1244, then a determination may be made 1412 about whether the metric 1232 is greater than the metric threshold 1242. If it is, then the image frame 802 may be sent 1414 to the image decoding system 1207. If it is determined 1410 that the trigger switch 942 is still activated, the method 1400 may then return to capturing 1404 another image frame 802. Otherwise, the method 1400 may end.

If it is determined 1412 that the metric 1232 is not greater than the metric threshold 1242, then an illumination system 103 of the barcode reading system 1200 may be activated 1416. The current image frame 802 and the next N image frames 802 (where N is an integer) may be discarded 1418, and the subsequent image frame 802 may be sent 1420 to the image decoding system 1207. If it is determined 1422 that the trigger switch 942 is still activated, the method 1400 may then return to capturing 1404 another image frame 802.

Figure 15:
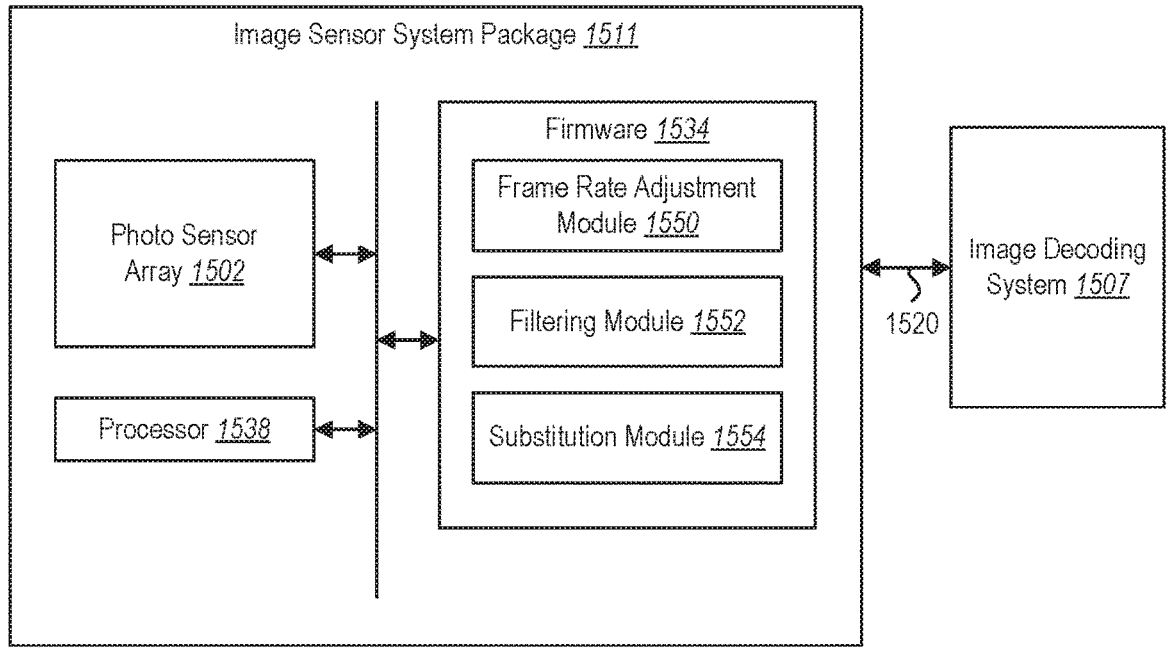
FIG. 15 illustrates another embodiment of a barcode reading system in accordance with the present disclosure.

FIG. 15 illustrates another embodiment of a barcode reading system 1500 in accordance with the present disclosure. Like the barcode reading system 1200 described previously, the barcode reading system 1500 includes an image decoding system 1507 coupled to an image sensor system package 1511 via a communication interface 1520. The image sensor system package 1511 includes a photo sensor array 1502 and a processor 1538.

In the depicted embodiment, the firmware 1534 within the image sensor system package 1511 is shown with several different examples of modules that may be utilized to improve the performance of the barcode reading system 1500. In particular, the firmware 1534 is shown with a frame rate adjustment module 1550, a filtering module 1552, and a substitution module 1554. These modules may be executed by the processor 1538 to implement the functionality described below.

The frame rate adjustment module 1550 may be configured to dynamically adjust the frame rate of image transfer, i.e., the rate at which image frames 802 are transferred across the communication interface 1520 to the image decoding system 1507. For example, a certain frame rate may be defined as the default frame rate. If an image frame 802 is captured that is too large to be transferred across the communication interface 1520 at the default frame rate, the frame rate adjustment module 1550 may increase the frame rate in order to permit the image frame 802 to be transferred.

The filtering module 1552 may be configured to filter at least some of the image frames 802 before they are transferred across the communication interface 1520 to the image decoding system 1507. In some embodiments, the image frames 802 that exceed a certain threshold size may be filtered before being transferred. Other image frames 802 that do not exceed the threshold size may be transferred without being filtered. Alternatively, in other embodiments, all image frames 802 may be filtered before being transferred.

Figure 16:
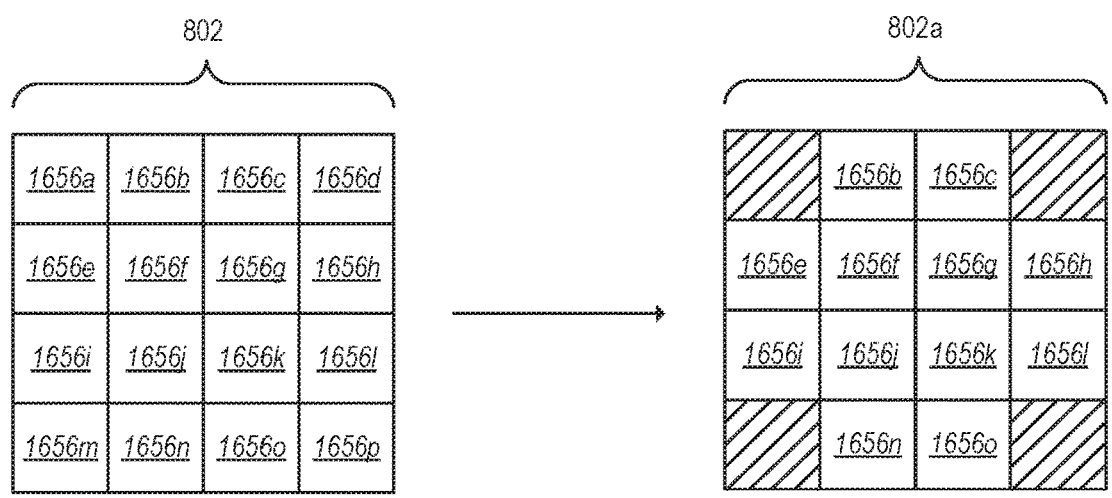
FIG. 16 illustrates an example showing how at least some of the image blocks of an image frame may be replaced with pre-identified data.

Referring to both to FIGS. 15 and 16, an image frame 802 may be transferred to the image decoding system 1507 as image blocks 1656a-p. The substitution module 1554 may be configured to replace at least some of the image blocks 1656a-p of an image frame 802 with pre-identified data. In the example shown in FIG. 16, image blocks 1656a, 1656d, 1656m, 1656p have been replaced with pre-identified data, thereby forming a modified image frame 802a. The pre-identified data may be recognizable by the image decoding system 1507 as data that can be discarded. The pre-identified data may be smaller in size than the image blocks 1656a, 1656d, 1656m, 1656p that are being replaced. In some embodiments, the image blocks 1656a, 1656d, 1656m, 1656p that are replaced may correspond to parts of the image frame 802 that do not include a barcode, or parts of the image frame 802 that are not necessary to decode a barcode.

Although the image sensor system package 1511 is shown with three different modules 1550, 1552, 1554 in the embodiment shown in FIG. 15, it is not necessary for the image sensor system package 1511 to include all of these modules 1550, 1552, 1554. In alternative embodiments, the image sensor system package 1511 may include only one or two of the depicted modules 1550, 1552, 1554. For example, an image sensor system package 1511 may include a frame rate adjustment module 1550 for dynamically adjusting the frame rate of image transfer, without being configured to perform filtering or replacement of image blocks.

Analysis and Decode Module

A barcode reading system may be used to capture and decode an image of a barcode. The barcode reading system may include an image capture system and a decoding system. The image capture system may capture images and the decoding system may attempt to decode the images.

A barcode reading system may attempt to determine whether a captured image is suitable for decoding. It may do so using the image capture system. The image capture system may use a variety of analysis tools to analyze a captured image. Each analysis tool (which may also be referred to as an analysis module or an analysis feature) may be configured to perform a particular type of analysis on the image of the barcode. Each analysis tool may have its own input and output and be separate from the decoding system. The barcode reading system may output a captured image to each of several different modules to perform different types of analyses. In sending the capture image to several different modules, the barcode reading system may send the captured image to a first module and then wait for output from that first module before sending the captured image to a second module. Thus, the image capture system may have to issue different tasks and get output from a variety of different modules. The decoding system may receive the captured image only when the barcode reading system is ready to decode the image.

It may be advantageous to consolidate the analysis features into the decoding system. Doing so may facilitate simpler, more efficient decoding. For example, consolidating the analysis features and the decoding system may greatly reduce the number of inputs and outputs involved in decoding an image. The image capture system could pass information to the decoding system in as a single input across an interface without having to manage the complexity of multiple analysis features. The decoding system could then receive the single input and manage both analysis and decoding and produce a single output across the interface. In such a system, the decoding system encapsulates the complexity of analysis and decoding. In this way, the image capture system has a single set of outputs to and inputs from the decoding system rather than multiple sets of inputs to and outputs from the various analysis features. Consolidating the analysis features into the decoding system may also allow the barcode reading system to more easily modify decoding parameters based on results of the analysis features.

Figure 17:
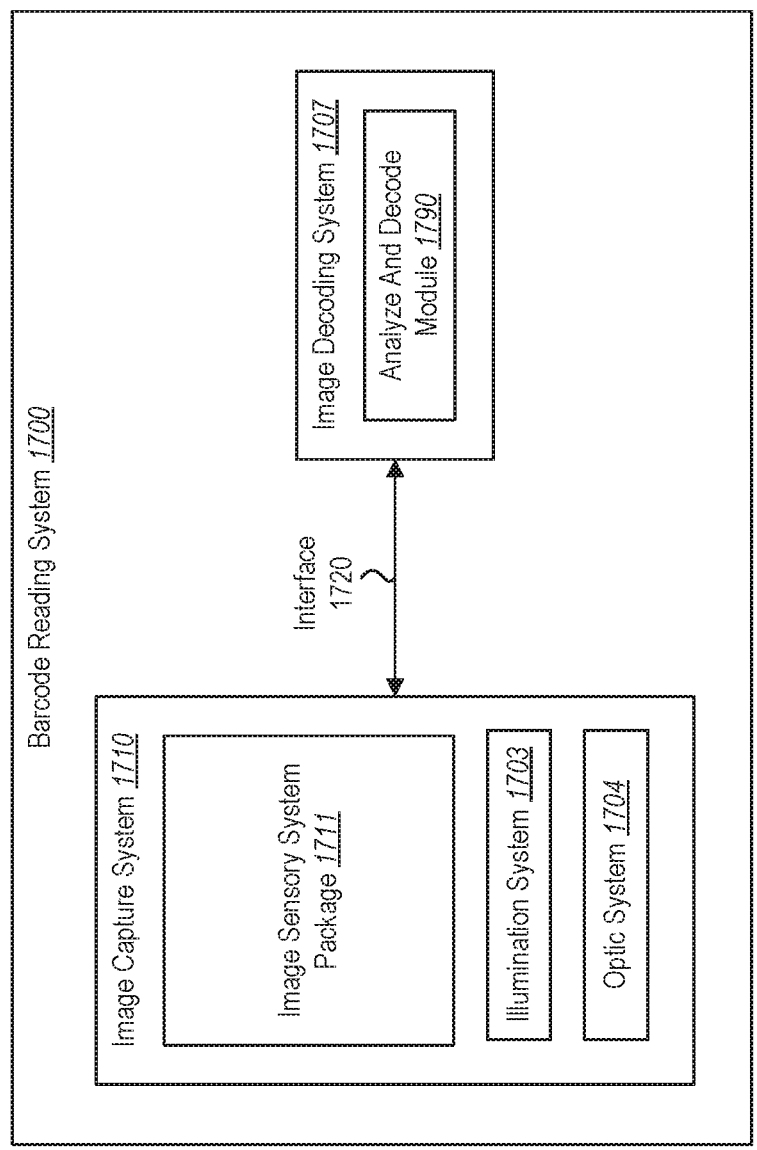
FIG. 17 illustrates an example of a barcode reading system that includes an analysis and decode module in accordance with the present disclosure.

FIG. 17 illustrates an example barcode reading system 1700 that includes an analysis and decode module 1790 in accordance with the present disclosure. The barcode reading system 1700 may include an image capture system 1710, an interface 1720, and an image decoding system 1707. The image capture system 1710 may include an image sensor system package 1711, an illumination system 1703, and an optic system 1704. The image sensor system package 1711 and the image decoding system 1707 may be included in two separate packages. The interface 1720 may couple the image sensor system package 1711 to the image decoding system 1707.

The image capture system 1710 may be configured to capture images. For example, the illumination system 1703 may illuminate a field of view of the optic system 1704 and the optic system 1704 may focus light onto a photo sensor array included in the image sensor system package 1711.

The image capture system 1710 may be configured to capture images using image capture settings. The image capture settings may define operating parameters for the various components of the image capture system 1710, including the image sensor system package 1711 and the illumination system 1703, to be used when capturing one or more images. The image capture settings may also include information about how many images to capture in an image burst. The image capture settings may also define whether the barcode reading system 1700 should continuously capture images. The image capture settings may also include information associated with one or more capture images. For example, the image capture settings may include information about whether an image has an associated motion baseline image or images and information about the position of an image in an image sequence. The image capture system 1710 may include information about default image capture settings. The image capture system 1710 may be configured to determine image capture settings and/or receive image capture settings (such as from the image decoding system 1707). The image capture parameter values discussed previously may be considered a subset of what may be included in the image capture settings.

The image capture system 1710 may be configured to output information to the image decoding system 1707 through the interface 1720. The image capture system 1710 may output information to the image decoding system 1707 using the image sensor system package 1711. The outputted information may include information for use in analyzing and/or decoding one or more captured images. The outputted information may include one or more images, image capture settings associated with the one or more images, decode parameters, and an operation list. The outputted information may be referred to as input settings.

The image decoding system 1707 may be configured to receive information from the image sensor system package 1711 through the interface 1720. The received information may be for use in analyzing and/or decoding one or more captured images. The received information may include one or more images, image capture settings associated with the one or more images, decode parameters, and an operation list.

The image decoding system 1707 may be configured to perform one or more operations based on the information received from the image sensor system package 1711. The image decoding system 1707 may be configured to determine output information (such as a result status and data) based on the one or more operations and provide the output information to the image sensor system package 1711 through the interface 1720. The output information may include information for use in determining image capture settings for capturing one or more new images. The image decoding system 1707 may determine the output information using the analysis and decode module 1790.

The analysis and decode module 1790 may include one or more analysis and decode features. Each feature may be configured to perform a particular operation on received information and to output data based on performing the particular operation on the received information. As noted above, the image decoding system 1707 may receive an operation list. The operation list may identify one or more of the analysis and decode features contained in the analysis and decode module 1790. The analysis and decode module 1790 may be configured to perform analysis features identified in the operation list on the one or more images received by the image decoding system 1707.

If the operation list identifies a decode feature, the analysis and decode module 1790 may attempt to decode the one or more images using the decode parameters received by the image decoding system 1707. The analysis and decode module 1790 may modify the decode parameters received by the image decoding system 1707 based on the results of performing the analysis features identified in the operation list.

The analysis and decode module 1790 may determine the result status and the data based on the outputs resulting from performing the analysis and decode features identified in the operation list. The result status may include information about what the analysis and decode module 1790 was able to detect in the one or more images. For example, the result status may indicate that the image decoding system 1707 decoded a barcode appearing in the one or more images, found nothing in the one or more images, located a barcode in the one or more images, detected a cellphone in the one or more images, or detected motion in the one or more images. The data may include information about how to modify future image capture settings to improve future captured images for purposes of decoding. For example, the data may include information about how to change gain, exposure time, and illumination intensity.

If the result status indicates that the image decoding system 1707 decoded a barcode appearing in the one or more images, the image decoding system 1707 may output decoded data for the barcode in the data.

The image sensor system package 1711 may use the result status, the data, and the image capture settings to determine new image capture settings for use in capturing one or more new images. In alternative designs, the image decoding system 1707 may use the result status, the data, and the image capture settings to determine new image capture settings for use in capturing one or more new images and output the new image capture settings to the image sensor system package 1711.

The image capture system 1710 may include default image capture settings, default decode parameters, and default operation lists. The image capture system 1710 also may be configured to determine image capture settings, decode parameters, and operation lists and/or receive image capture settings, decode parameters, and operation lists (such as from the image decoding system 1707). The image capture system 1710 may be configured to determine image capture settings, decode parameters, and operations lists using information received from the image decoding system 1707.

The interface 1720 may be configured so that the image capture system 1720 can utilize all the various functionality of the image decoding system 1707 using the interface 1720. In other words, the interface 1720 may be configured so that the image capture system 1720 can utilize different functionality of the image decoding system 1707 by changing the information provided to the image decoding system 1707 instead of having to output information across different interfaces. In this way, the interface 1720 may allow the image capture system 1710 to utilize the various functions of the image decoding system 1707 without having to manage multiple inputs to various functions. The interface 1720 may also allow the image capture system 1710 to utilize the functionality of the image decoding system 1707 without having to manage the operation of the image decoding system 1707.

The interface 1720 may be configured to allow the image decoding system 1707 to output all the various output information it may produce to the image sensor system package 1711 using the interface 1720. In this way, the interface 1720 may allow the image sensor system package 1711 to receive output information from a variety of features without having to manage the complexity of multiple outputs from the variety of features.

Figure 18:
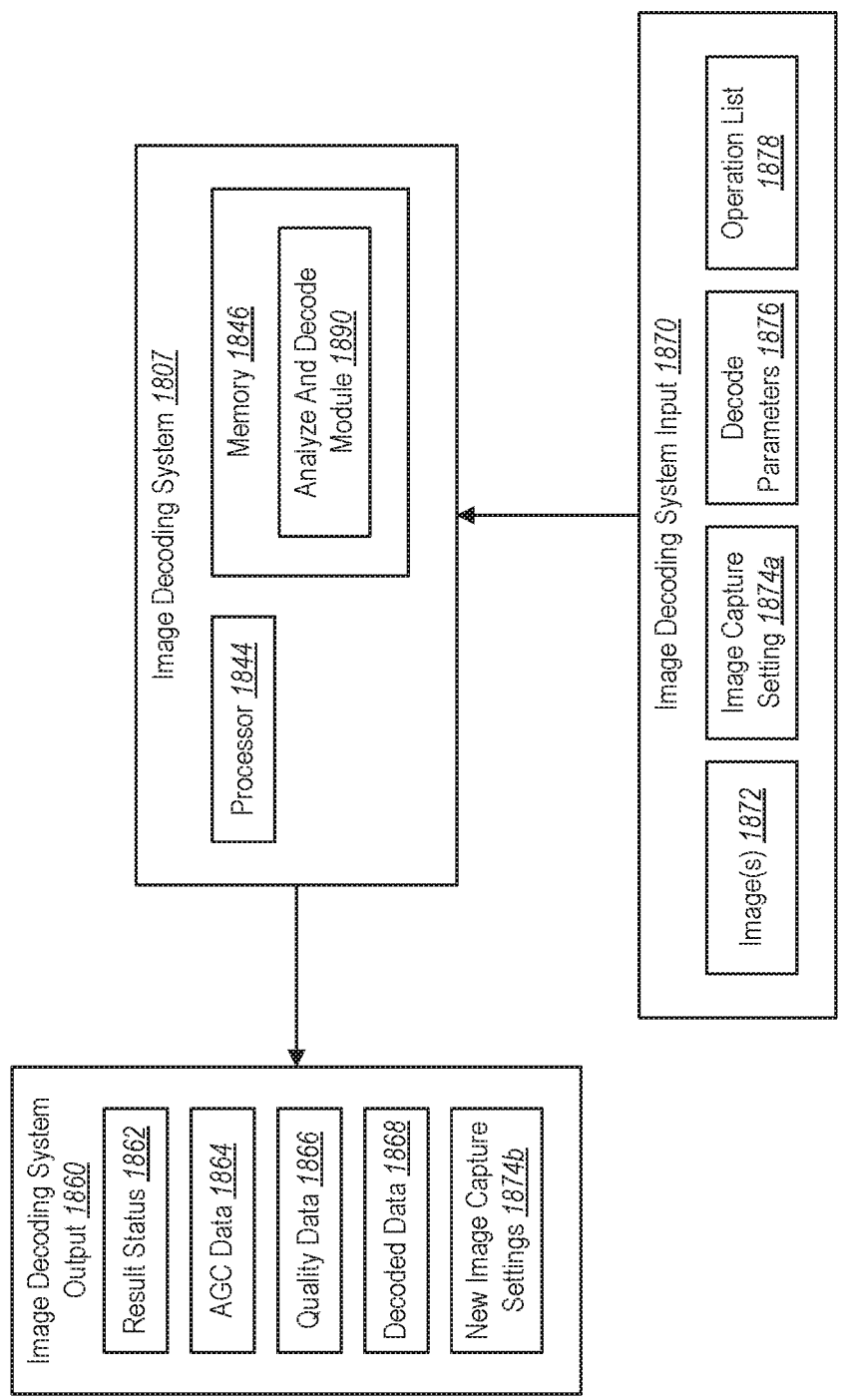
FIG. 18 illustrates an example of an image decoding system that includes an analysis and decode module in accordance with the present disclosure.

FIG. 18 illustrates one potential example of an image decoding system 1807. The image decoding system 1807 includes a processor 1844 and memory 1846. The memory 1846 includes an analysis and decode module 1890.

The processor 1844 may be a combination of one or more microprocessors, microcontrollers, digital signal processors (DSP), or the like, and, when operating, may execute instructions (in the form of an operating system and/or applications) stored in the memory 1846.

The memory 1846 may be any component capable of storing electronic information, including an operating system and/or application instructions executable by the processor 1844, and may be embodied as read-only memory (ROM), random access memory (RAM), magnetic disk storage media, optical storage media, flash memory devices, on-board memory included with the processor 1844, erasable programmable read-only memory (EPROM), electrically erasable programmable read-only memory (EEPROM), and/or registers, etc.

The analysis and decode module 1890 may include analysis and decode blocks that include analysis and decode features. The analysis and decode blocks may include the following analysis and decode features: Automatic Gain Control (AGC) analysis, quality analysis, cellphone detection analysis, motion detection analysis, and decode.

The image decoding system 1807 may be configured to receive image decoding system input 1870. The image decoding system input 1870 may be any information for use in analyzing and/or decoding one or more images. The image decoding system input 1870 may be referred to as input settings. The image decoding system input 1870 may include one or more images 1872, image capture settings 1874a associated with the one or more images 1872, decode parameters 1876, and an operation list 1878.

The one or more images 1872 may include data representing one or more images captured by an image capture system, such as the image capture system 1710. The image capture system may have captured the one or more images 1872 according to the image capture settings 1874a.

The decode parameters 1876 may include information for use by the decode feature in decoding a barcode. The decode parameters 1876 may include information about enabled symbologies, timeout limit, and Region of Interest. The decode parameters 1876 may indicate quick decode.

The operation list 1878 may identify one or more of the analysis and decode features included in the analysis and decode module 1890. The operation list 1878 may identify only analysis features, only decode features, or a combination of analysis features and decode features. Thus, in connection with an operation list, this disclosure may also reference "analysis or decode feature(s)" in addition to "analysis and decode feature." But references to "analysis and decode feature(s)" in connection with an operation list should not be interpreted to mean that an operation list necessarily includes both analysis features and decode features.

The image decoding system 1807 may be configured to output image decoding system output 1860 based on performing one or more operations using the image decoding system input 1870. The image decoding system output 1860 may be any information for use in determining image capture settings, decode parameters, or an operation list. The image decoding system output 1860 may include a result status 1862, AGC data 1864, quality data 1866, and decoded data 1868. In some designs, the image decoding system output 1860 may also include new image capture settings 1874b. When the image decoding system output 1860 includes the new image capture settings 1874b, the image decoding system output 1860 may not include the result status 1862, the AGC data 1864, or the quality data 1866.

The result status 1862 may include information about what the image decoding system 1807 could determine about the one or more images 1872 based on performing the analysis and decode features identified in the operation list 1878. For example, the result status 1862 may include information indicating that the image decoding system 1807 decoded a barcode in the one or more images 1872, found nothing in the one or more images 1872, located a barcode in the one or more images 1872, detected a cellphone in the one or more images 1872, or detected motion in the one or more images 1872.

The AGC data 1864 may include information for adjusting gain, exposure time, and illumination intensity percentage. For example, the AGC data 1864 may include information indicating a fixed increase, fixed decrease, or no change in Automatic Gain Control values. As another example, the AGC data 1864 may include information indicating a scale percent value for adjusting Automatic Gain Control values. The image decoding system output 1860 may not include AGC data 1864 depending on the features identified in the operation list 1878.

The quality data 1866 may indicate a quality level of the one or more images 1872. When the one or more images 1872 include a dual field image, the quality data 1866 may indicate separate quality levels for each field. The quality data 1866 may be used to determine which of two fields in a dual field image contains a higher quality image. The image decoding system output 1860 may not include quality data 1866 depending on the features identified in the operation list 1878.

The decoded data 1868 may be data decoded from a barcode in the one or more images 1872. When the image decoding system 1807 is unable to decode a barcode in the one or more images 1872, the image decoding system output 1860 may not include decoded data 1868. The image decoding system output 1860 may not include decoded data 1868 depending on the features identified in the operation list 1878.

As noted above, in some designs, the image decoding system output 1860 may include the new image capture settings 1874b. The new image capture settings 1874b may include operational parameters for use by an image capture system in capturing one or more new images (i.e., images captured at a time different from a time when the one or more images 1872 were captured).

The image decoding system 1807 may be configured to determine the result status 1862, the AGC data 1864, the quality data 1866, and the decoded data 1868 using the analysis and decode module 1890, which may use the one or more images 1872, the image capture settings 1874a, the operation list 1878, and the decode parameters 1876.

The image decoding system 1807 may be configured to provide the image decoding system input 1870 to the analysis and decode module 1890. The analysis and decode module 1890 may be configured to, after receiving the image decoding system input 1870, select a first analysis and decode feature identified in the operation list 1878. The analysis and decode module 1890 may be configured to process the one or more images 1872 using the first analysis and decode feature to determine a first block output.

The analysis and decode module 1890 may be configured to determine whether the operation list 1878 identifies another analysis and decode feature, in addition to the first analysis and decode feature. If the operation list 1878 does not identify another analysis and decode feature, the analysis and decode module 1890 may determine the image decoding system output 1860 based on the first block output.

If the operation list 1878 identifies another analysis and decode feature, the analysis and decode module 1890 may modify the decode parameters 1876 based at least in part on the first block output. The analysis and decode module 1890 may also select a second analysis and decode feature from the operation list 1878 and process the one or more images 1872 using the second analysis and decode feature to determine a second block output. The analysis and decode module 1890 may again determine whether the operation list 1878 identifies one or more additional analysis and decode features. If the analysis and decode module 1890 includes one or more additional analysis and decode features, the analysis and decode module 1890 may modify the decode parameters 1876 based on the second block output, process the one or more images 1872 using the one or more additional analysis and decode features, produce one or more additional block outputs, and modify the decode parameters 1876.

Once the analysis and decode module 1890 completes the operation list 1878, the analysis and decode module 1890 may use the first block output, the second block output, and the one or more additional block outputs to determine the image decoding system output 1860.

Figure 19:
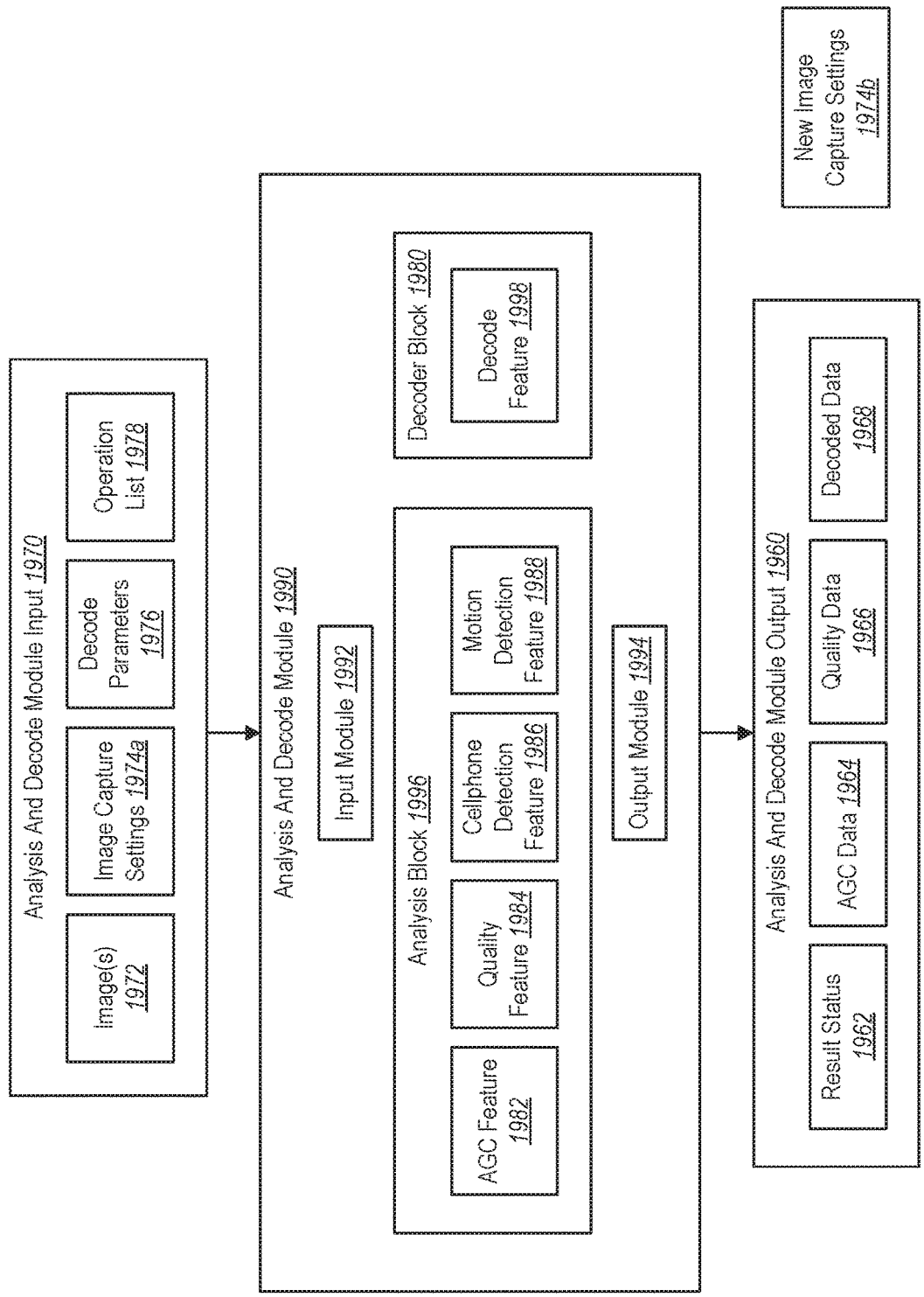
FIG. 19 illustrates an example of an analysis and decode module in accordance with the present disclosure.

FIG. 19 illustrates one potential example of an analysis and decode module 1990. The analysis and decode module 1990 may receive analysis and decode module input 1970 and output analysis and decode module output 1960.

The analysis and decode module input 1970 may include any information useful for analyzing and/or decoding one or more images. The analysis and decode module input 1970 may include one or more images 1972, image capture settings 1974*a*, decode parameters 1976, and an operation list 1978.

The one or more images 1972 may have been captured by an image capture system. The image capture settings 1974*a* may include operational parameters used to capture the one or more images 1972. The image capture settings 1974*a* may include additional information related to the one or more images 1972.

The decode parameters 1976 may be parameters relevant to decoding an image of a barcode. The decode parameters 1976 may include information regarding enabled symbologies, timeout limit, region of interest, and other decode features.

The operation list 1978 may identify one or more analysis or decode features included in the analysis and decode module 1990.

The analysis and decode module output 1960 may include any information useful for determining image capture settings, decode parameters, or an operation list. The analysis and decode module output 1960 may include result status 1962, Automatic Gain Control (AGC) data 1964, quality data 1966, and decoded data 1968. In some designs, the analysis and decode module output 1960 may include new image capture settings 1974*b*. The types of information included in the analysis and decode module output 1960 may depend on the contents of the operation list 1978.

The result status 1962 may contain information regarding the results of operations performed on the one or more images 1972 by the analysis and decode module 1990. The result status 1962 may indicate that the analysis and decode module 1990 decoded a barcode in the one or more images 1972. The result status 1962 may indicate that the analysis and decode module 1990 did not find a barcode in the one or more images 1972. The result status 1962 may indicate that the analysis and decode module 1990 located a barcode in the one or more images 1972. The result status 1962 may indicate that the analysis and decode module 1990 detected a cellphone in the one or more images 1972. The result status 1962 may indicate that the analysis and decode module 1990 detected motion in the one or more images 1972.

The AGC data 1964 may include information regarding suggested adjustments to the image capture settings 1974*a*. The AGC data 1964 may indicate whether to increase gain, decrease gain, or leave gain the same. The AGC data 1964 may also indicate a scale percent value for modifying gain. The AGC data 1964 may include information regarding where to move along an AGC curve for purposes of setting image capture settings for use in capturing a subsequent image. An AGC curve may be a chart that, for each value 0% to 100%, defines a corresponding set of gain, exposure time, and illumination intensity percentage.

The quality data 1966 may include information indicating quality of the one or more images 1972. For dual field images, the quality data 1966 may include separate information for each field.

The analysis and decode module 1990 may include an input module 1992, an analysis block 1996, a decoder block 1980, and an output module 1994.

The analysis block 1996 may include one or more analysis features for analyzing the one or more images 1972. Each of the one or more analysis features may be configured to receive input (including the one or more images 1972), process the input, and produce a block output. The analysis block 1996 may include the following analysis features: Automatic Gain Control (AGC) feature 1982, quality feature 1984, cellphone detection feature 1986, and motion detection feature 1988.

The AGC feature 1982 may be configured to determine whether AGC parameters (which may include or help determine gain, exposure, and illumination parameters) used to capture the one or more images 1972 should be adjusted for purposes of setting image capture settings for capturing future images. The AGC feature 1982 may be configured to determine how the AGC parameters should be adjusted. The AGC feature 1982 may be configured to determine if the one or more images 1972 are too dark or too light for purposes of decoding a barcode in the one or more images 1972.

The quality feature 1984 may be configured to determine a quality level of the one or more images 1972. The quality feature 1984 may determine a quality level for both fields of a dual field image. The quality feature 1984 may work on both fields of a dual field image to determine the best quality field for use in decoding a barcode.

The cellphone detection feature 1986 may be configured to determine whether a cellphone is present in the one or more images 1972.

The motion detection feature 1988 may be configured to determine the presence of motion in the one or more images 1972. The motion detection feature 1988 may analyze two adjacent images from the one or more images 1972 to identify differences between the two adjacent images.

The decoder block 1980 may include a decode feature 1998. The decode feature 1998 may be configured to detect whether the one or more images 1972 include a barcode, locate a barcode in the one or more images 1972, and decode a barcode in the one or more images 1972. The decode feature 1998 may be configured to decode a barcode according to the decode parameters 1976.

The input module 1992 may be configured to receive the analysis and decode module input 1970. The input module 1992 may be configured to select analysis and decode features identified in the operation list 1978 one at a time and cause the analysis and decode module 1990 to perform selected analysis and decode features one at a time after each selection. For example, assume the operation list 1978 identified the AGC feature 1982, the quality feature 1984, and the decode feature 1998. The input module 1992 may first select the AGC feature 1982 and provide input to the AGC feature 1982. The AGC feature 1982 may then process the input and produce an AGC output. The input module 1992 may then select the quality feature 1984 and provide input to the quality feature 1984. The quality feature 1984 may then process the input and produce a quality output. The input module 1992 may then select the decode feature 1998 and provide input to the decode feature 1998. The decode feature 1998 may then produce a decode output. The input provided to each feature may not be identical. In some designs, the input module 1992 may be configured such that it can select analysis and decode features identified in the operation list 1978 in any order. In some designs, the input module 1992 may be configured to, when the operation list 1978 identifies the decode feature, select the decode feature 1998 last.

The input module 1992 may be configured to, under certain circumstances, skip analysis and decode features identified in the operation list 1978. In some designs, the input module 1992 may be configured to skip analysis and decode features identified in the operation list 1978 based on the image capture settings 1974a. For example, the input module 1992 may be configured to, when the operation list 1978 includes the cellphone detection feature 1986, skip the cellphone detection feature 1986 if illumination intensity is zero.

The input module 1992 may be configured to, under circumstances, add one or more analysis and decode features to the operation list 1978. For example, the input module 1992 may add the quality feature 1984 to the operation list 1978 if the quality feature 1984 is not identified in the operation list 1978, the image capture settings 1974a indicate a dual field image, and the operation list 1978 includes the decode feature 1998.

The output module 1994 may be configured to receive output from the analysis block 1996 and the decoder block 1990, such as output from the AGC feature 1982, the quality feature 1984, the cellphone detection feature 1986, the motion detection feature 1988, and the decode feature 1998. The output module 1994 may be configured to receive the operation list 1978. The output module 1994 may be configured to remove a feature from the operation list 1978 after the input module 1992 selects that feature. The output module 1994 may be configured to remove from the operation list 1978 features that the input module 1992 skips. The output module 1994 may return the operation list 1978 to the input module 1992 if, after removing a selected and/or skipped feature, the operation list 1978 still identifies one or more analysis or decode features.

The output module 1994 may be configured to modify the decode parameters 1976. The output module 1994 may be configured to modify the decode parameters 1976 based on output of one or more analysis features. The output module 1994 may modify the decode parameters 1976 to optimize the decoding process. Modifying the decode parameters 1976 may include causing the analysis and decode module 1990 to not perform the decode feature 1998 even though the operation list 1978 identifies the decode feature 1998. For example, if the AGC feature 1982 determines the one or more images 1972 are too dark, the output module 1994 may determine to skip the decode feature 1998 identified in the operation list 1978 in hopes of receiving an image more suitable for decoding in a future cycle.

For dual field images with decoding both fields, the analysis and decode module 1990 may be configured to first attempt to decode the best quality field. If the best quality field cannot be decoded, the analysis and decode module 1990 may attempt to decode the other field.

The output module 1994 may be configured to determine the analysis and decode module output 1960. The output module 1994 may determine the analysis and decode module output 1960 after the analysis and decode module 1990 completes the operation list 1978. Completing the operation list 1978 may include skipping features identified in the operation list 1978 and performing additional features not originally included in the operation list 1978. The output module 1994 may determine the analysis and decode module output 1960 based on output from the analysis block 1996 and the decoder block 1980. The output module 1994 may also consider the analysis and decode module input 1970 in determining the analysis and decode module output 1960. For example, the output module 1994 may be configured such that if the operation list 1978 identifies both the motion detection feature 1988 and the decode feature 1998, if a barcode is decoded but no motion is detected, the output module 1994 may output a result status indicating nothing found instead of decoded.

In some designs, the analysis and decode module 1990 may also output the new image capture settings 1974b. The analysis and decode module 1990 may determine the new image capture settings 1974b based on the analysis and decode module input 1970 and output from the analysis block 1996 and the decoder block 1980.

Figure 20:
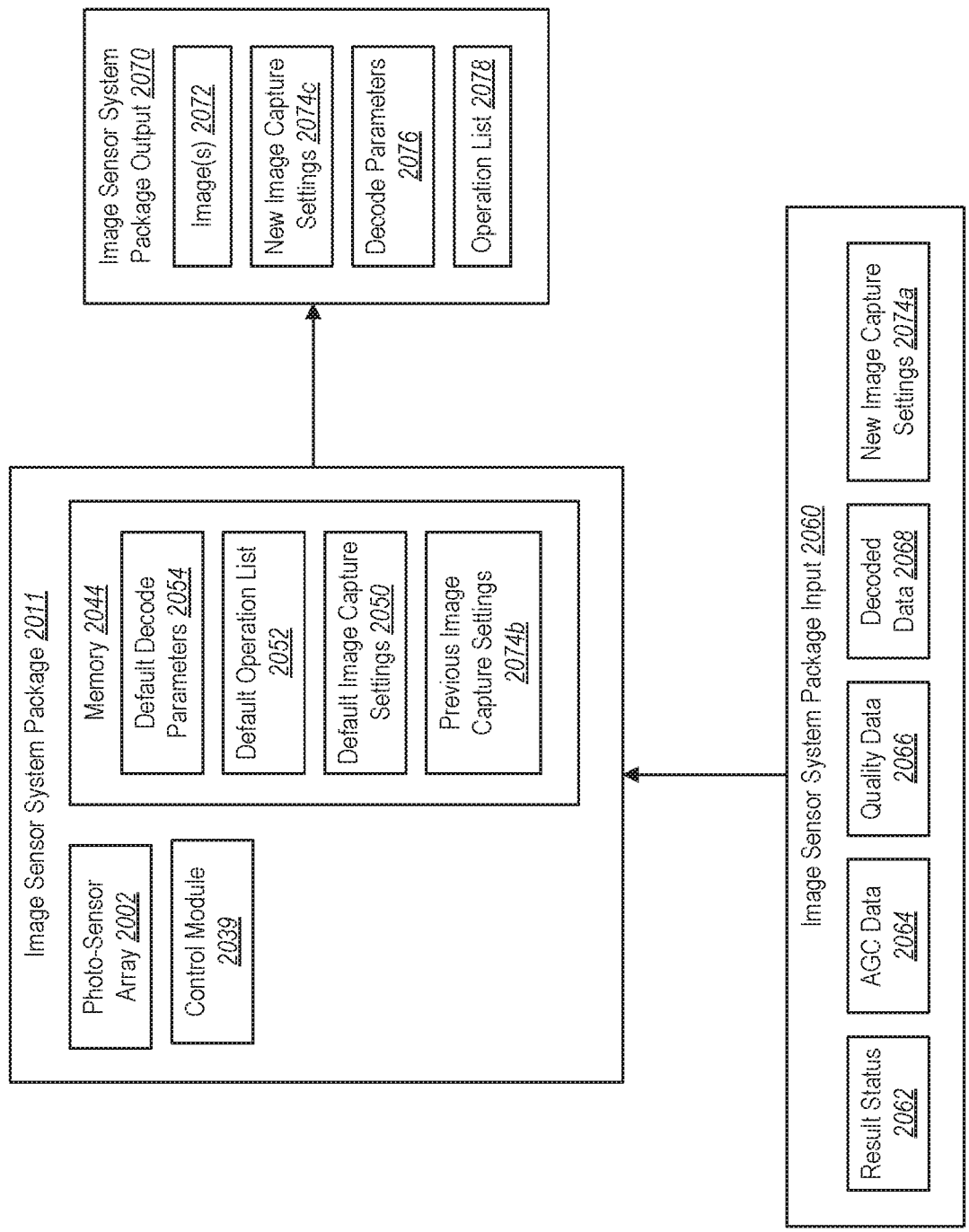
FIG. 20 illustrates an example of an image sensor system package that may be used in connection with an analysis and decode module in accordance with the present disclosure.

FIG. 20 illustrates one potential example of an image sensor system package 2011. The image sensor system package 2011 may include a photo sensor array 2002, a control module 2039, and memory 2044. The memory 2044 may include default decode parameters 2054, default operation lists 2052, and default image capture settings 2050. The memory 2044 may also include previous image capture settings 2074b.

The image sensor system package 2011 may be configured to receive an image sensor system package input 2060. The image sensor system package input 2060 may include any information useful for determining image capture settings, decode parameters, or an operation list. The image sensor system package input 2060 may include a result status 2062, AGC data 2064, quality data 2066, decoded data 2068, and, in some designs, image capture settings 2074a.

The image sensor system package 2011 may be configured to output an image sensor system package output 2070. The image sensor system package output 2070 may include one or more images 2072, image capture settings 2074b, decode parameters 2076, and an operation list 2078. The image sensor system package output 2070 may be referred to as input settings.

An optic system may focus illumination from a field of view of a barcode reading system onto the photo sensor array 2002. The photo sensor array 2002 may have the same properties as the photo sensor array 102 described previously.

The control module 2039 may be configured to control operation of the image sensor system package 2011. The control module 2039 may also control other systems in a barcode reading system that are used to capture images, such as an illumination system.

The control module 2039 may set operational parameters of an image capture system based on received image capture settings. The image sensor system package 2011 may receive image capture settings from one or more sources. For example, the image sensor system package 2011 may receive the new image capture settings 2074*a* from an image decoding system as part of the image sensor system package input 2060. The image sensor system package 2011 may also receive image capture settings from a barcode reading application or from a remote server. The control module 2039 may be configured to cause an image capture system to capture the one or more images 2072 using received image capture settings.

The control module 2039 may set operational parameters of an image capture system based on stored image capture settings. For example, the image sensor system package 2011 may set the operation parameters of an image capture system based on the default image capture settings 2050 stored in the memory 2044. The control module 2039 may be configured to cause an image capture system to capture the one or more images 2072 using stored image capture settings.

The control module 2039 may be configured to set operational parameters of an image capture system based on determined image capture settings. The control module 2039 may be configured to determine image capture settings based on the image sensor system package input 2060 and the previous image capture settings 2074*b*. In FIG. 20, the previous image capture settings 2074*b* are stored in the memory 2044. In some designs, however, the previous image capture settings 2074*b* may be received as part of the image sensor system package input 2060 or may be received in some other way. The control module 2039 may also be configured to determine the decode parameters 2076 and the operation list 2078 based at least in part on one or more of the result status 2062, the AGC data 2064, the quality data 2066, and the previous image capture settings 2074*b*. The control module 2039 may be configured to cause an image capture system to capture the one or more images 2072 using determined image capture settings.

Regardless of whether the control module 2039 captured the one or more images 2072 using received, stored, or determined image capture settings, the image sensor system package 2011 may be configured to include in the image sensor system package output 2070 the image capture setting used to capture the one or more images 2072 as the new image capture settings 2074*c*.

The new image capture settings 2074*c* may include operating parameter values for various components of an image capture system. For example, the new image capture settings 2074 may specify the following operating parameters of the image capture system: illumination type, whether illumination is on or off, intensity of illumination, Automatic Gain Control (AGC) values, Automatic Gain Control Region of Interest, field type (single field or dual field), and whether to include motion baseline images.

The new image capture settings 2074*c* may also include information about properties of the one or more images 2072. For example, the new image capture settings 2074*c* may include information about the position of an image in an image sequence started from a trigger. The new image capture settings 2074*c* may also indicate whether an image has associated motion baseline images.

The new image capture settings 2074*c* may also define a number of images the image capture system captured.

The new image capture settings 2074*c* may also define whether, for a dual field image, only the best field should be decoded or whether both fields should be decoded.

The default decode parameters 2054 may include one or more sets of decode parameters for use on startup of a barcode readings system or under other specified circumstances. The image sensor system package 2011 may include in the image sensor system package output 2070 a set of decode parameters from the default decode parameters 2054 as the decode parameters 2076. In other circumstances, the decode parameters 2076 included in the image sensor system package output 2070 may have been determined by the control module 2039 based on the image sensor system package input 2060 and the previous image capture settings 2074*b*.

The default operation lists 2052 may include one or more operation lists for use on startup of a barcode readings system or under other specified circumstances. The image sensor system package 2011 may include in the image sensor system package output 2070 an operation list from the default operation lists 2052 as the operation list 2078. In other circumstances, the operation list 2078 included in the image sensor system package output 2070 may have been determined by the control module 2039 based on the image sensor system package input 2060 and the previous image capture settings 2074*b*.

The default image capture settings 2050 may include one or more sets of image capture settings for use on startup of a barcode readings system or under other specified circumstances. The image sensor system package 2011 may include in the image sensor system package output 2070 a set of image capture settings from the default image capture settings 2050 as the new image capture settings 2074*c*. In other circumstances, the new image capture settings 2074*c* included in the image sensor system package output 2070 may have been determined by the control module 2039 based on the image sensor system package input 2060 and the previous image capture settings 2074*b*. In some cases, the new image capture settings 2074*c* may include the new image capture settings 2074*a* that the image sensor system package 2011 received as part of the image sensor system package input 2060.

Figure 21:
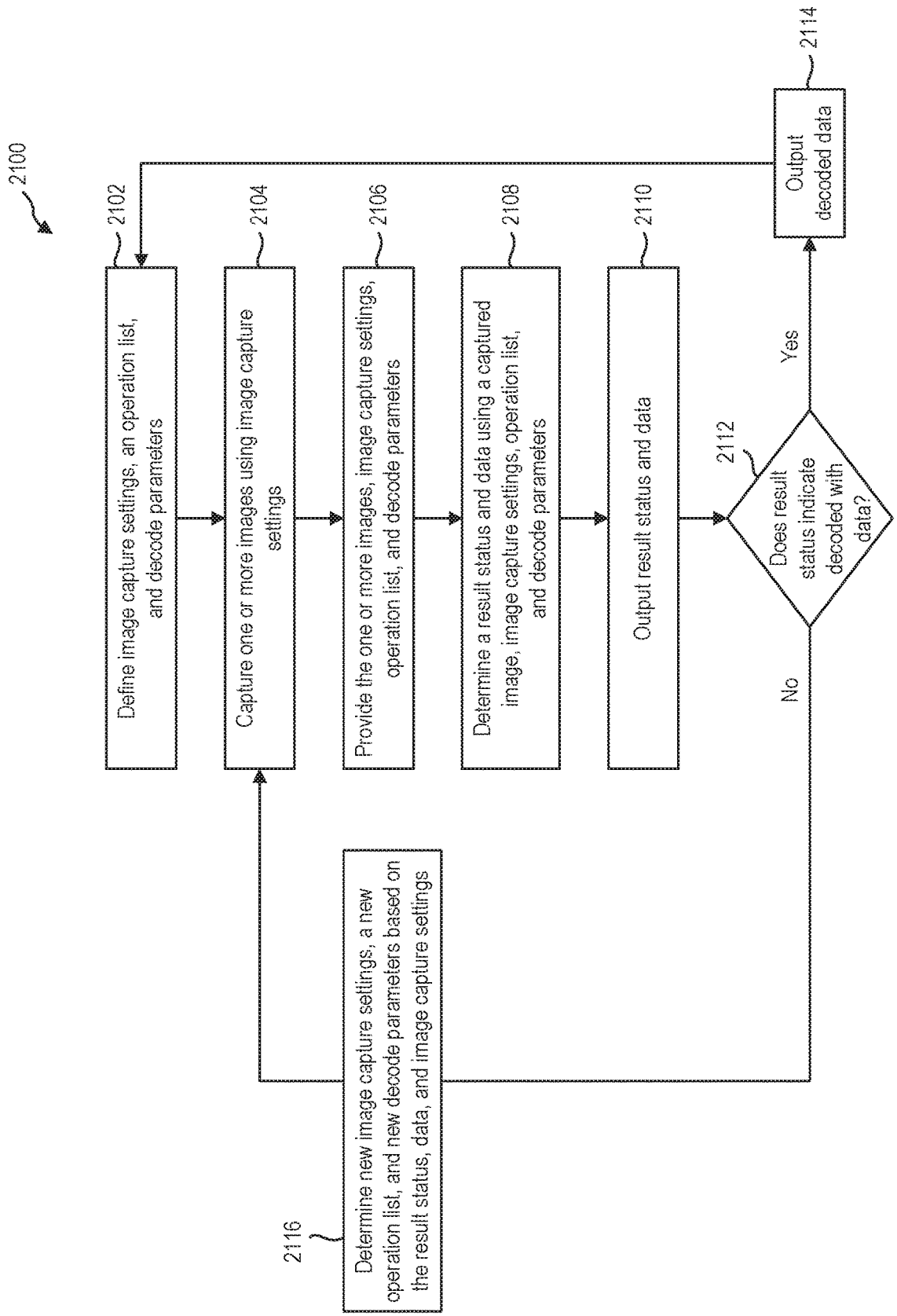
FIG. 21 is a flow diagram that illustrates a method for using a barcode reading system that includes an analysis and decode module in accordance with the present disclosure.

FIG. 21 illustrates one potential method 2100 for decoding a barcode. The method 2100 may include defining 2102 image capture settings, an operation list, and decode parameters to default settings. Defining 2102 the image capture settings, the operation list, and the decode parameters may include defining the image capture settings, the operation list, and the decode parameters according to (1) a stored set of image capture settings, a stored operation list, and/or a stored set of decode parameters, (2) a received set of image capture settings, a received operation list, and/or a received set of decode parameters, and/or (3) a determined set of image capture settings, a determined operation list, and/or a determined set of decode parameters. Defining 2102 the image capture settings, the operation list, and the decode parameters may include determining whether to determine the image capture settings, the operation list, and the decode parameters or use a stored set of image capture settings, a stored operation list, and/or a stored set of decode parameters.

The method 2100 may include capturing 2104 one or more images using the image capture settings. Capturing 2104 the one or more images using the image capture settings may be accomplished using an image capture system that may include an image sensor system package.

The method 2100 may include providing 2106 the one or more images, the image capture settings, the operation list, and the decode parameters. The one or more images, the image capture settings, the operation list, and the decode parameters may be provided to an analysis and decode module. The one or more images, the image capture settings, the operation list, and the decode parameters may be referred to as input settings. The analysis and decode module may be in a separate package from the image sensor system package. Providing 2106 the one or more images, the image capture settings, the operation list, and the decode parameters may be done using an interface. The interface may connect the analysis and decode module with the image sensor system package.

The method 2100 may include determining 2108 a result status and data using one or more of the one or more images, the image capture settings, the operation list, and the decode parameters. The analysis and decode module may determine the result status and the data. Determining 2108 the result status and the data may be accomplished using a method 2200 shown in FIG. 22.

The method 2100 may include outputting 2110 the result status and the data. The analysis and decode module may output the result status and the data. Outputting 2110 the result status and the data may be done using the interface connecting the analysis and decode module and the image sensor system package.

The method 2100 may include determining 2112 whether the result status indicates decoded with data.

If the result status indicates decoded with data, the method 2100 may include outputting 2114 decoded data. The method 2100 may then return to defining 2102 image capture settings, an operation list, and decode parameters. Defining 2102 may include defining image capture settings, an operation list, and decode parameters using default values, using previously used values, or using determined values.

If the result status does not indicate decoded with data, the method 2100 may include determining 2116 new image capture settings, a new operation list, and new decode parameters based on one or more of the result status, the data, and the image capture settings. The method 2100 may then return to capturing 2104 one or more images using image capture settings. In this case, capturing 2104 one or more images may include capturing one or more images using the new image capture settings. Similarly, the one or more images, the image capture settings, the operation list, and the decode parameters provided to the analysis and decode module may be the one or more images captured using the one or more new image capture settings, the new image capture settings, the new operation list, and the new decode parameters.

Figure 22:
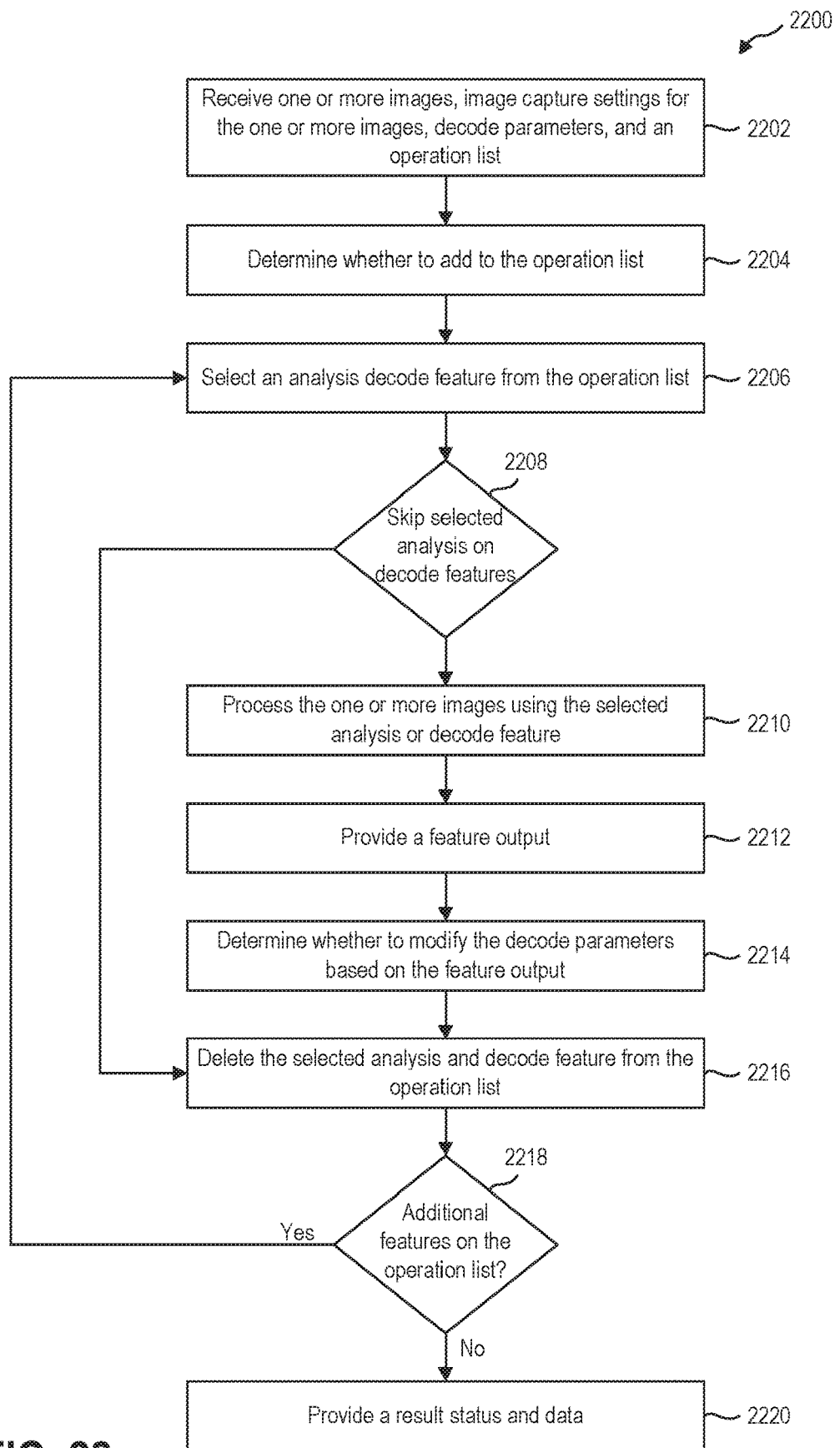
FIG. 22 is a flow diagram for using an analysis and decode module in accordance with the present disclosure.

FIG. 22 illustrates one example method 2200 for utilizing an analysis and decode module according to the present disclosure. The method 2200 may include receiving 2202 one or more images, image capture settings for the one or more images, decode parameters, and an operation list.

The method 2200 may include determining 2204 whether to add to the operation list. Determining 2204 whether to add to the operation list may include adding an analysis and decode feature to the operation list. Determining 2204 whether to add an analysis and decode feature may be based on what analysis and decode features are included in the operation list and the image capture settings.

The method 2200 may include selecting 2206 an analysis or decode feature from the operation list. The method 2200 may be configured to select analysis or decode features in any order. The method 2200 may also be configured to select a decode feature, if identified in the operation list, last.

The method 2200 may include determining 2208 whether to skip the selected analysis or decode feature. If the method 2200 determines to skip the selected analysis or decode feature, the method 2200 may proceed to step 2216.

If the method 2200 determines to not skip the selected analysis or decode feature, the method 2200 processes 2210 the one or more images using the selected analysis or decode feature.

The method 2200 may include providing 2212 a feature output. The feature output 2212 may be based on processing the one or more images using the selected analysis or decode feature.

The method 2200 may include determining 2214 whether to modify the decode parameters based on the feature output. Determining 2214 whether to modify the decode parameters may include modifying the decode parameters. Modifying the decode parameters may include deleting a decode feature identified in the operation list or otherwise not processing the one or more images using a decode feature even though the operation list identifies the decode feature.

The method 2200 may include deleting 2216 the selected analysis or decode feature from the operation list.

The method 2200 may include determining 2218 whether the operation list identifies one or more additional features.

If the operation list does not identify one or more additional features, the method 2200 includes providing 2220 a result status and data. The result status and the data may be based on the one or more feature outputs provided. The result status may include information about the contents of the one or more images. The result status may include information indicating decoded with decoded data, nothing found, located barcode, cellphone detected, or motion detected. The data may include information about whether the one or more images are suitable for decoding. The data may include information about how to modify the image capture settings for use in capturing new images. The data may include AGC data, quality data, and decoded data.

If the operation list identifies one or more additional features, the method 2200 may return to step 2206.

To facilitate further understanding of the disclosure two examples of how information output from an image decoding system may cause modifications to image capture settings and an operation list are provided.

Assume the following initial input settings: illumination type is IR; AGC values are mid set of three sets (low, mid, and high); AGC ROI is at image center with width (x) and height (y); decode parameters include quick decode; motion baseline images is yes; continuous scanning is yes; and operation list is AGC, cellphone detection, motion detection, and decode.

Based on those initial input settings, a result status indicating the following may result in the following corresponding modifications to the initial input settings:

| Result Status | Modifications to Input Settings |
| --- | --- |
| Decoded with decoded data | RED for next N images until the barcode is not decoded |
| Nothing found | IR with quick decode and operation list as AGC, cellphone detection, motion detection, and decode |
| Located barcode | RED with normal decode and operation list as AGC, cellphone detection, and decode |
| Cellphone detected | RED and 0 intensity (cellphone image with fixed AGC) with normal decode feature and operation list as AGC, cellphone detection, and decode |

Based on the initial input settings described above, AGC data indicating the following may result in the following corresponding modifications to the initial input settings:

| AGC Data | Modifications to Input Settings |
| --- | --- |
| Fixed decrease/same/increase | IR image AGC values: move down/stay the same/move up from previous values in one of three AGC sets |
| A scale percent value | RED image AGC values: scale percent of previous values |

For the above, motion baseline images are included for the first IR image when the illumination type is changed from RED to IR.

Assume the following initial input settings: illumination type is RED_M; AGC values are RED_M, 30% of Motion-AGC curve (a low brightness AGC curve) or RED_D, 30% of Decode-AGC curve (a normal brightness AGC curve); AGC ROI is at image center with width (x) and height (y); decode parameters include symbologies enabled, timeout time, ROI, etc. (general decode parameters); motion baseline images is yes; continuous scanning is yes; and operation list for RED_M is cellphone detection and motion detection or for RED_D is AGC analysis, cellphone detection, and decode.

Based on those initial input settings, a result status indicating the following may result in the following corresponding modifications to the initial input settings:

| Result Status | Modifications to Input Settings |
| --- | --- |
| Decoded with decoded data | RED_D for next N images until the barcode is not decoded |
| Nothing found | RED_M with operation list of motion detection and cellphone detection |
| Located barcode | RED_D and 0 intensity (cellphone image with fixed AGC) with operation list of AGC analysis, cellphone detection, and decode |
| Cellphone detected | RED_D with operation list as AGC analysis, cellphone detection, and decode |

Based on the initial input settings described above, AGC data indicating the following may result in the following corresponding modifications to the initial input settings:

| AGC Data | Modifications to Input Settings |
| --- | --- |
| Fixed decrease/same/increase | RED_M with AGC values of move down 4%/stay the same/move up 4% from previous values |
| A scale percent value | RED_D image with AGC values of scale percent of previous values |

For the above, motion baseline images are included for the first RED_M image when the illumination type is changed from RED_D to RED_M.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

As used herein, the terms "coupled" and "connected" refer to components being in electrical communication with each other and/or mechanically affixed to each other, depending on the context, whether directly (i.e., without any intermediate components) or indirectly (i.e., via one or more intermediate components).

In an example, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A barcode reading system, comprising:
   an image capture system comprising an image sensor system package, wherein the image sensor system package includes a control module, wherein the image capture system is configured to capture a first image using a first set of capture settings and a second image using a second set of capture settings, and wherein the control module is configured to determine the second set of capture settings for use by the image capture system in capturing the second image;
   an interface; and
   an image decoding system configured to receive the first image and the first set of capture settings from the image sensor system package through the interface and to output a first result status and a first set of data to the image sensor system package through the interface, wherein the control module is configured to receive the first result status, the first set of data, and the first set of capture settings and determine the second set of capture settings based at least in part on one or more of the first result status, the first set of data, and the first set of capture settings.

2. The barcode reading system of claim 1, wherein the image decoding system is further configured to receive a first operation list and wherein the image decoding system includes analysis and decode blocks configured to perform analysis and decode features and wherein the first operation list identifies one or more of the analysis and decode features.

3. The barcode reading system of claim 2, wherein the analysis and decode blocks include one or more of an Automatic Gain Control feature, a quality feature, a cellphone detection feature, a motion detection feature, and a decode feature.

4. The barcode reading system of claim 3, wherein the image decoding system is further configured to, after receiving the first image:
select a first analysis and decode feature identified in the first operation list; and
process the first image using the first analysis and decode feature to determine a first block output.

5. The barcode reading system of claim 4, wherein the image decoding system is further configured to determine whether the first operation list identifies another analysis and decode feature and, if the first operation list does not identify another analysis and decode feature, determine the first result status and the first set of data based on the first block output.

6. The barcode reading system of claim 5, wherein the image decoding system is further configured to receive a first set of decode parameters and, if the first operation list identifies another analysis and decode feature:
determine a new set of decode parameters based at least in part on the first block output;
select a second analysis and decode feature from the first operation list; and
process the first image using the second analysis and decode feature to determine a second block output.

7. The barcode reading system of claim 1, wherein the image decoding system is further configured to receive a first set of decode parameters and a first operation list and the control module is further configured to determine a second set of decode parameters and a second operation list based at least in part on one or more of the first result status, the first set of data, and the first set of capture settings.

8. The barcode reading system of claim 1, wherein the first result status indicates one or more of decoded with data, nothing found, located barcode, cellphone detected, or motion detected and the first set of data includes one or more of AGC data and quality data.

9. The barcode reading system of claim 8, wherein the image decoding system is further configured to receive the second image and the second set of capture settings and output to the image sensor system package, through the interface, a second result status and a second set of data.

10. The barcode reading system of claim 9 further configured to, if the second result status indicates decoded with data, output decoded data for the second image.

11. The barcode reading system of claim 10, wherein the control module is further configured to, if the second result status does not indicate decoded with data, determine a third set of capture settings for use in capturing a third image based at least in part on one or more of the second result status, the second set of data, and the second set of capture settings.

12. A computer-readable medium comprising instructions that are executable by one or more processors to cause a computing system to:
receive, by an image decoding system, a first image and a first set of input settings;
determine, by the image decoding system, a first result status and a first set of data using the first image and the first set of input settings;
determine that the first result status does not indicate decoded with data; and
determine, by an image sensor system package, a second set of input settings based at least in part on the first result status, the first set of data, and the first set of input settings.

13. The computer-readable medium of claim 12, wherein the first set of input settings include a first set of image capture settings used for capturing the first image, a first set of decode parameters, and a first operation list.

14. The computer-readable medium of claim 13, wherein the first operation list identifies one or more analysis and decode features and determining the first result status and the first set of data includes analyzing the first image using a first analysis and decode feature identified in the first operation list.

15. The computer-readable medium of claim 14 further comprising additional instructions that are executable by the one or more processors to cause the computing system to:
receive, by the image decoding system, a second image and the second set of input settings; and
determine, by the image decoding system, a second result status and a second set of data using the second image and the second set of input settings.

16. The computer-readable medium of claim 15 further comprising additional instructions that are executable by the one or more processors to cause the computing system to:
determine, by the image sensor system package, that the second result status indicates decoded with data; and
output decoded data for the second image.

17. The computer-readable medium of claim 15 further comprising additional instructions that are executable by the one or more processors to cause the computing system to:
determine that the second result status does not indicate decoded with data; and
determine, by the image sensor system package, a third set of input settings based at least in part on the second result status, the second set of data, and the second set of input settings.

18. A computer-readable medium comprising instructions that are executable by one or more processors to cause a computing system to:
receive an image of a barcode, capture settings for the image of the barcode, decode parameters, and an operation list, wherein the operation list identifies two or more analysis and decode features;
for each analysis and decode feature identified in the operation list that is not skipped:
process the image using the analysis and decode feature to determine a feature result status and a set of feature data; and
determine whether to modify the decode parameters based on the feature result status and the set of feature data, wherein modifying the decode parameters includes changing the decode parameters and skipping a decode feature; and output a result status and a set of data for use in determining a new set of capture settings.

19. The computer-readable medium of claim 18 further comprising additional instructions that are executable by the one or more processors to cause the computing system to:
   determine whether to add additional analysis and decode features to the operation list based on the capture settings and the operation list; and
   for each analysis and decode feature identified in the operation list, after processing the image using the analysis and decode feature, remove the analysis and decode feature from the operation list.

20. The computer-readable medium of claim 18 further comprising additional instructions that are executable by the one or more processors to cause the computing system to:
   for each analysis and decode feature identified in the operation list, determine whether to skip the analysis and decode feature based on the capture settings.

* * * * *